United States Patent
Vekiarides

(10) Patent No.: US 7,386,610 B1
(45) Date of Patent: Jun. 10, 2008

(54) INTERNET PROTOCOL DATA MIRRORING

(75) Inventor: Nicos A. Vekiarides, Dedham, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 711 days.

(21) Appl. No.: 09/664,499

(22) Filed: Sep. 18, 2000

(51) Int. Cl.
*G06F 15/173* (2006.01)
*G06F 15/167* (2006.01)

(52) U.S. Cl. .................. 709/224; 709/213; 709/223; 709/248

(58) Field of Classification Search ............... 709/206, 709/212, 213, 216–219, 227, 223, 224, 249
See application file for complete search history.

(56) References Cited

U.S. PATENT DOCUMENTS

| | | | |
|---|---|---|---|
| 4,274,139 A | 6/1981 | Hodgkinson et al. | 364/200 |
| 4,404,647 A | 9/1983 | Jones et al. | 364/900 |
| 4,611,298 A | 9/1986 | Schuldt | 364/900 |
| 4,654,819 A | 3/1987 | Stiffler et al. | 364/900 |
| 4,688,221 A | 8/1987 | Nakamura et al. | 371/13 |
| 4,701,915 A | 10/1987 | Kitamura et al. | 371/13 |
| 4,942,579 A | 7/1990 | Goodlander et al. | 371/51 |
| 4,996,687 A | 2/1991 | Hess et al. | 371/10.1 |
| 5,051,887 A | 9/1991 | Berger et al. | 364/200 |
| 5,129,088 A | 7/1992 | Auslander et al. | 395/700 |

(Continued)

FOREIGN PATENT DOCUMENTS

| | | |
|---|---|---|
| EP | 0 767 427 A2 | 4/1997 |
| WO | WO 92/18931 | 10/1992 |

OTHER PUBLICATIONS

Definition of "data mirroring" from webopedia.com (http://www.webopedia.com/TERM/D/data_mirroring.html).

(Continued)

*Primary Examiner*—Ario Etienne
*Assistant Examiner*—Hussein El-chanti

(57) ABSTRACT

A method, system, and computer program product for mirroring data in a computer network is described. At least one connection is established between a local storage server and a mirror storage server. A primary storage request is received from a network host at the local storage server. A mirror storage request is sent across the established at least one connection from the local storage server, wherein the mirror storage request corresponds to the received primary storage request. The mirror storage request is processed at the mirror storage server. A first heartbeat signal is sent from the local storage server to the mirror storage server. A second heartbeat signal is sent from the mirror storage server to the local storage server. Data of the received mirror storage request is stored in a mirror storage device corresponding to a primary storage device. A response is sent across the established at least one connection from the mirror storage server, wherein the response indicates whether the storing of data of the received mirror storage request step was successful. An interruption may be detected in the second heartbeat signal at the local storage server. The established at least one connection is closed. Mirror storage requests are queued. The second heartbeat signal is received at the local storage server after the detected interruption of the second heartbeat signal. The closed at least one connection is re-established. The queued mirror storage requests are sent across the re-established at least one connection after the re-establishing step.

48 Claims, 23 Drawing Sheets

U.S. PATENT DOCUMENTS

| | | | |
|---|---|---|---|
| 5,136,523 A | 8/1992 | Landers | 395/54 |
| 5,138,710 A | 8/1992 | Kruesi et al. | 395/575 |
| 5,155,845 A | 10/1992 | Beal et al. | 395/575 |
| 5,157,663 A | 10/1992 | Major et al. | 371/9.1 |
| 5,167,011 A | 11/1992 | Priest | 395/54 |
| 5,175,849 A | 12/1992 | Schneider | 395/600 |
| 5,185,884 A | 2/1993 | Martin et al. | 395/575 |
| 5,206,939 A | 4/1993 | Yanai et al. | 395/400 |
| 5,212,784 A | 5/1993 | Sparks | 395/575 |
| 5,212,789 A | 5/1993 | Rago | 395/600 |
| 5,235,601 A | 8/1993 | Stallmo et al. | 371/40.1 |
| 5,257,367 A | 10/1993 | Goodlander et al. | 39/600 |
| 5,263,154 A | 11/1993 | Eastridge et al. | 395/575 |
| 5,276,867 A | 1/1994 | Konley et al. | 395/600 |
| 5,278,838 A | 1/1994 | Ng et al. | 371/10.1 |
| 5,317,731 A | 5/1994 | Dias et al. | 395/600 |
| 5,325,505 A | 6/1994 | Hoffecker et al. | 395/425 |
| 5,347,653 A | 9/1994 | Flynn et al. | 395/600 |
| 5,357,509 A | 10/1994 | Ohizumi | 371/10.1 |
| 5,367,682 A | 11/1994 | Chang | 395/700 |
| 5,375,232 A | 12/1994 | Legvold et al. | 395/575 |
| 5,390,313 A | 2/1995 | Yanai et al. | 395/425 |
| 5,404,361 A | 4/1995 | Casorso et al. | 371/40.1 |
| 5,430,866 A | 7/1995 | Lawrence et al. | 395/575 |
| 5,430,885 A | 7/1995 | Kaneko et al. | 395/800 |
| 5,432,922 A | 7/1995 | Polyzois et al. | 395/425 |
| 5,435,004 A | 7/1995 | Cox et al. | 395/575 |
| 5,452,420 A | 9/1995 | Engdahl et al. | 395/285 |
| 5,479,615 A | 12/1995 | Ishii et al. | 395/250 |
| 5,481,701 A | 1/1996 | Chambers, IV | 395/600 |
| 5,495,601 A | 2/1996 | Narang et al. | 395/600 |
| 5,497,483 A | 3/1996 | Beardsley et al. | 395/575 |
| 5,504,882 A | 4/1996 | Chai et al. | 395/182.3 |
| 5,519,844 A | 5/1996 | Stallmo | 395/441 |
| 5,522,046 A | 5/1996 | McMillen et al. | 395/200.15 |
| 5,528,759 A | 6/1996 | Moore | 395/200.11 |
| 5,530,845 A | 6/1996 | Hiatt et al. | 395/500 |
| 5,537,533 A | 7/1996 | Staheli et al. | 395/182.03 |
| 5,544,347 A | 8/1996 | Yanai et al. | 395/489 |
| 5,546,535 A | 8/1996 | Stallmo et al. | 395/182.07 |
| 5,546,556 A | 8/1996 | Matsushita | 395/427 |
| 5,559,958 A | 9/1996 | Farrand et al. | 395/183.03 |
| 5,561,815 A | 10/1996 | Takata et al. | 395/833 |
| 5,566,316 A | 10/1996 | Fechner et al. | 395/441 |
| 5,568,628 A | 10/1996 | Satoh et al. | 395/440 |
| 5,568,629 A | 10/1996 | Gentry et al. | 395/441 |
| 5,574,863 A * | 11/1996 | Nelson et al. | 710/100 |
| 5,583,994 A | 12/1996 | Rangan | 395/200.09 |
| 5,596,736 A | 1/1997 | Kerns | 395/404 |
| 5,611,069 A | 3/1997 | Matoba | 395/441 |
| 5,619,694 A | 4/1997 | Shimazu | 395/615 |
| 5,625,818 A | 4/1997 | Zarmer et al. | 395/615 |
| 5,659,787 A | 8/1997 | Schieltz | 395/200.56 |
| 5,664,144 A | 9/1997 | Yanai et al. | 711/113 |
| 5,671,439 A | 9/1997 | Klein et al. | 395/821 |
| 5,673,322 A | 9/1997 | Pepe et al. | 380/49 |
| 5,673,382 A | 9/1997 | Cannon et al. | 395/182.04 |
| 5,680,580 A | 10/1997 | Beardsley et al. | 395/489 |
| 5,684,945 A | 11/1997 | Chen et al. | 395/182.18 |
| 5,692,155 A | 11/1997 | Iskiyan et al. | 395/489 |
| 5,710,885 A | 1/1998 | Bondi | 395/200.54 |
| 5,710,918 A | 1/1998 | Lagarde et al. | 395/610 |
| 5,715,393 A | 2/1998 | Naugle | 395/200.11 |
| 5,719,942 A | 2/1998 | Aldred et al. | 380/49 |
| 5,720,027 A | 2/1998 | Sarkozy et al. | 395/182.04 |
| 5,732,238 A | 3/1998 | Sarkozy | 395/440 |
| 5,737,743 A | 4/1998 | Ooe et al. | 711/112 |
| 5,740,397 A | 4/1998 | Levy | 395/441 |
| 5,742,792 A | 4/1998 | Yanai et al. | 395/489 |
| 5,745,789 A | 4/1998 | Kakuta | 395/841 |
| 5,748,897 A | 5/1998 | Katiyar | 395/200.49 |
| 5,761,410 A | 6/1998 | Martin et al. | 395/183.18 |
| 5,761,507 A | 6/1998 | Govett | 395/684 |
| 5,764,913 A | 6/1998 | Jancke et al. | 395/200.54 |
| 5,765,186 A | 6/1998 | Searby | 711/100 |
| 5,765,204 A | 6/1998 | Bakke et al. | 711/202 |
| 5,768,623 A | 6/1998 | Judd et al. | 395/857 |
| 5,771,367 A | 6/1998 | Beardsley et al. | 395/489 |
| 5,774,655 A | 6/1998 | Bloem et al. | 395/200.5 |
| 5,774,680 A | 6/1998 | Wanner et al. | 395/290 |
| 5,784,703 A | 7/1998 | Muraoka et al. | 711/173 |
| 5,787,304 A | 7/1998 | Hodges et al. | 395/821 |
| 5,787,459 A | 7/1998 | Stallmo et al. | 711/112 |
| 5,787,470 A | 7/1998 | DeSimone et al. | 711/124 |
| 5,787,485 A | 7/1998 | Fitzgerald et al. | 711/162 |
| 5,790,774 A | 8/1998 | Sarkozy | 395/182.04 |
| 5,805,919 A | 9/1998 | Anderson | 395/821 |
| 5,809,328 A | 9/1998 | Nogales et al. | 395/825 |
| 5,809,332 A | 9/1998 | Vishlitzky et al. | 395/835 |
| 5,812,754 A | 9/1998 | Lui et al. | 395/182.04 |
| 5,812,784 A | 9/1998 | Watson et al. | 395/200.57 |
| 5,819,020 A | 10/1998 | Beeler, Jr. | 395/182.03 |
| 5,828,475 A | 10/1998 | Dennett et al. | 359/139 |
| 5,828,820 A | 10/1998 | Onishi et al. | 395/182.04 |
| 5,832,088 A | 11/1998 | Nakajima et al. | 380/22 |
| 5,835,718 A | 11/1998 | Blewett | 395/200.48 |
| 5,835,764 A | 11/1998 | Platt et al. | 395/671 |
| 5,842,224 A | 11/1998 | Fenner | 711/202 |
| 5,848,251 A | 12/1998 | Lomelino et al. | 395/309 |
| 5,850,522 A | 12/1998 | Wlaschin | 395/200.45 |
| 5,852,715 A | 12/1998 | Raz et al. | 395/200.31 |
| 5,857,208 A | 1/1999 | Ofek | 707/204 |
| 5,857,213 A | 1/1999 | Benhase et al. | 711/112 |
| 5,873,125 A | 2/1999 | Kawamoto | 711/202 |
| 5,889,935 A | 3/1999 | Ofek et al. | 395/182.04 |
| 5,893,919 A | 4/1999 | Sarkozy et al. | 711/114 |
| 5,894,554 A | 4/1999 | Lowery et al. | 395/200.33 |
| 5,897,661 A | 4/1999 | Baranovsky et al. | 711/170 |
| 5,901,280 A | 5/1999 | Mizuno et al. | 395/182.04 |
| 5,901,327 A | 5/1999 | Ofek | 395/825 |
| 5,909,692 A | 6/1999 | Yanai et al. | 711/4 |
| 5,911,150 A | 6/1999 | Peterson et al. | 711/162 |
| 5,911,779 A | 6/1999 | Stallmo et al. | 714/5 |
| 5,912,897 A | 6/1999 | Steinbach | 370/467 |
| 5,926,833 A | 7/1999 | Rasoulian et al. | 711/147 |
| 5,933,614 A | 8/1999 | Tavallaei et al. | 395/309 |
| 5,933,653 A | 8/1999 | Ofek | 395/826 |
| 5,940,865 A | 8/1999 | Ohzora et al. | 711/167 |
| 5,941,972 A | 8/1999 | Hoese et al. | 710/129 |
| 5,948,108 A | 9/1999 | Lu et al. | 714/4 |
| 5,956,750 A | 9/1999 | Yamamoto et al. | 711/167 |
| 5,959,994 A | 9/1999 | Boggs et al. | 370/399 |
| 5,960,216 A | 9/1999 | Vishlitzky et al. | 395/894 |
| 5,961,593 A | 10/1999 | Gabber et al. | 709/219 |
| 5,969,841 A | 10/1999 | McGinley et al. | 359/163 |
| 5,974,566 A | 10/1999 | Ault et al. | 714/15 |
| 5,978,890 A | 11/1999 | Ozawa et al. | 711/163 |
| 5,983,316 A | 11/1999 | Norwood | 711/112 |
| 5,987,627 A | 11/1999 | Rawlings, III | 714/48 |
| 6,003,030 A | 12/1999 | Kenner et al. | 707/10 |
| 6,003,065 A | 12/1999 | Yan et al. | 709/201 |
| 6,006,017 A | 12/1999 | Joshi et al. | 395/200.11 |
| 6,009,478 A | 12/1999 | Panner et al. | 710/5 |
| 6,012,120 A | 1/2000 | Duncan et al. | 710/129 |
| 6,014,731 A | 1/2000 | Totsuka et al. | 711/202 |
| 6,016,676 A | 1/2000 | McClain | 707/204 |
| 6,021,436 A | 2/2000 | Garrett | 709/224 |
| 6,029,000 A | 2/2000 | Woolsey et al. | 395/705 |
| 6,038,379 A | 3/2000 | Fletcher et al. | 395/200.8 |
| 6,038,630 A | 3/2000 | Foster et al. | 710/132 |
| 6,041,381 A | 3/2000 | Hoese | 710/129 |
| 6,044,081 A | 3/2000 | Bell et al. | 370/401 |
| 6,047,350 A | 4/2000 | Dutton et al. | 710/129 |
| 6,049,819 A | 4/2000 | Buckle et al. | 709/202 |

| | | | | |
|---|---|---|---|---|
| 6,049,828 | A | 4/2000 | Dev et al. | 709/224 |
| 6,052,727 | A | 4/2000 | Kamalanathan | 709/224 |
| 6,052,736 | A | 4/2000 | Ogle et al. | 709/244 |
| 6,052,759 | A | 4/2000 | Stallmo et al. | 711/114 |
| 6,052,797 | A | 4/2000 | Ofek et al. | 716/6 |
| 6,055,602 | A | 4/2000 | McIlvain et al. | 711/112 |
| 6,057,863 | A | 5/2000 | Olarig | 345/520 |
| 6,061,356 | A | 5/2000 | Terry | 370/401 |
| 6,061,687 | A | 5/2000 | Wooten | 707/101 |
| 6,063,128 | A | 5/2000 | Bentley et al. | 703/6 |
| 6,065,085 | A | 5/2000 | Odenwald, Jr. et al. | 710/129 |
| 6,065,087 | A | 5/2000 | Keaveny et al. | 710/129 |
| 6,065,096 | A | 5/2000 | Day et al. | 711/114 |
| 6,065,100 | A | 5/2000 | Schafer et al. | 711/137 |
| 6,066,181 | A | 5/2000 | DeMaster | 717/5 |
| 6,073,209 | A | 6/2000 | Bergsten | 711/114 |
| 6,073,222 | A | 6/2000 | Ohran | 711/162 |
| 6,081,834 | A | 6/2000 | Brandt et al. | 709/213 |
| 6,085,193 | A | 7/2000 | Malkin et al. | 707/10 |
| 6,098,128 | A | 8/2000 | Velez-McCaskey et al. | 710/65 |
| 6,098,146 | A | 8/2000 | Bouvier et al. | 711/100 |
| 6,101,497 | A | 8/2000 | Ofek | 707/10 |
| 6,148,412 | A | 11/2000 | Cannon et al. | 716/6 |
| 6,308,284 | B1 | 10/2001 | LeCrone et al. | |
| 6,417,934 | B1 * | 7/2002 | Sadr-Salek | 358/442 |
| 6,449,734 | B1 * | 9/2002 | Shrivastava et al. | 714/15 |
| 6,543,001 | B2 | 4/2003 | LeCrone et al. | |
| 6,606,643 | B1 * | 8/2003 | Emens et al. | 709/203 |
| 6,633,587 | B1 * | 10/2003 | Bennett | 370/469 |
| 6,654,752 | B2 * | 11/2003 | Ofek | 707/10 |
| 6,671,705 | B1 * | 12/2003 | Duprey et al. | 707/204 |

OTHER PUBLICATIONS

Definition of "disk mirroring" from webopedia.com (http://www.webopedia.com/TERM/D/disk_mirroring.html).

"What is data mirroring?" from LIUtilities (http://www.liutilities.com/products/winbackup/backupterms/datamirroring/).

Use of term "remotely mirrored" in a whitepaper from the Winter Corporation entitled "Enterprise Data Integrity, The Role of Storage in Database Integrity and Restartability" (http://www.emc.com/continuity/edi_winter_corp.dpf-size524.2k, at p. 1).

"Real time data mirroring and replication" from InTechnology (http://www.intechnology.co.uk./html/MDS/replicationintro.asp).

"Mirrored storage" from EMC (http://www.emc.com/pdf/news/1202_robinson.pdf).

Definition of "clustering" from webopedia.com (http://www.webopedia.com/TERM/C/clustering.html).

Symmetrix 3000 and 5000 Enterprise Storage Systems Product Description Guide, EMC Corporation, downloaded in Sep. 2000, from http://ww.emc.com/product_pdfs/pdg/symm_3_5_pdg.pdf, pp. 7-32.

Robertson, Bruce, "New Products Make replication Easier; An Analysis," Network computing, The Gale Group, Sep. 1993, p. 99.

Lawrence, Andrew, "Remote Disks: The evolution of remote disk support over public lines means that disk can now be located thousands of kilometers away from the central processor," The Gate Group, IBM System user, vol. 14, No. 2, Feb. 1993, p. 14.

Bobrowski, Steve, "Protecting your date: Overview and Comparison of Backup and Recovery in Database Servers," The Gale Group, DBMS, vol. 6, No. 8, Jul. 1993, p. 55.

Patent Abstracts of Japan, Patent No. JP63010286, published Jan. 16, 1988.

International Search Report issued Aug. 27, 2001 for PCT/US00/32493, 8 pages.

Veklarides, Nicos, "Fault-Tolerant Disk Storage and file Systems Using Reflective Memory," IEEE, Proceedings of the 28th Annual Hawaii International Conference on System Sciences, 1995, pp. 103-113.

Vekiaridea, Nicos, "Implementation of a Fault-Tolerant Disk Storage System Using Reflective Memory," date and publisher unknown, pp. 1-28.

"Program for Experting Transmission Control Protocol-Based Services through firewalls," IBM Corp. IBM Technical Disclosure Bulletin, vol. 40, No. 12, Dec. 1997, pp. 161-162.

"Product Brief May 2000; StorageApps' SAH Appliance," The Enterprise Storage Group, 2000, pp. 1-3.

"Enterprise Storage Reports Technical Review," Enterprise Storage Group, www.enterprisestoragegroup.com, vol. 6, date unknown, 5 pages.

Christensen, Brands, "Building a Storage-Area Network: SANS Boost Performance, Reliability, amd Scalability of the Critical Link Between Servers and Storage Devices," Data Communications, Apr. 21, 1998, pp. 67-71.

Jandor, Mary, "Launching a Storage-Area Net; High-Speed Storage-Area Network Help Net Managers Hurl Stored Data Around Quickly and Take the Load off the Lan and Wan," Data Communications, Mar. 21, 1998, pp. 64-72.

Press Release, HP's High-Speed 1/0 Business Unit, Helwett Packard, Aug. 1997, 3 pages.

Press Release, "HP's Tachyon Fibre Channel Controller Chosen by Compaq: Industry-Leading IC to Enable Next-Generation Storage Solutions," Hewlett Packard, Aug. 6, 1997, 3 pages.

Press Release, "HP's Tachyon famiy of Fibre Channel Protocol Controllers to be Part of Compaq's Next-Generation Storage Solutions," Hewlett Packard, Dec. 7, 1998, 2 pages.

Mace, Scott, "Serving Up Storage," The McGraw-Hill Companies, Inc., BYTE, vol. 23, No. 1, Jan. 1998, pp. 72.

Kennedy, Carle, "Fibre Channel Speeds the Convergence of Network and Storage," Storage Management Solutions, Nov. 1997, pp. 28-31.

Floming, Vincent, "Raid in Clusters," Storage Management Solutions, Mar. 1998, pp. 51-53.

Smith, Brian R., "How Will Migrating to Fibre Channel Occur?" Computer Technology Review, date unknown, pp. 92, 94, 95.

Snively, Robert, "SCSI applications on Fibre Channel," High-Speed Fiber Networks and channels II, The Society of Photo-Optical Instrumentation Engineers, Proceedings SPIE - The International Society for Optical Engineering, Sep. 8-9, 1992, vol. 1784, pp. 104-113.

International Search Report issued Oct. 9, 2001 for PCT/US00/42337, 7 pages.

Bannister, Dick, "Compaq Storage Resource Manager," Evaluator Group Inc., Storage Nowe, vol. 2, Issue 4, Apr. 2000.

* cited by examiner

INTERNET PROTOCOL DATA MIRRORING

CROSS-REFERENCE TO OTHER APPLICATIONS

The following applications of common assignee are related to the present application, and are herein incorporated by reference in their entireties:

"Method and System of Allocating Storage Resources in a Storage Area Network," Ser. No. 09/664,500 filed concurrently herewith "Method, System, and Computer Program Product for Managing Storage Resources," Ser. No. 09/664,314 filed concurrently herewith.

"Method, System, and Computer Program Product for a Data Propagation Platform and Applications of Same," Ser. No. 09/665,583 concurrently herewith.

BACKGROUND OF THE INVENTION

1. Field of the Invention

The invention relates generally to the field of storage area networks, and more particularly to the mirroring of data storage in storage area networks.

2. Related Art

A variety of techniques exist for handling storage of large quantities of data, which is typically required for the effective operation of computer systems in computer networks. These techniques include host-based and storage-based storage management systems. Storage area networks (SANs) have been developed recently as an additional approach to providing access to data in computer networks. A SAN is a network linking servers or workstations to storage devices. A SAN is intended to increase the pool of storage available to each server in the computer network, while reducing the data supply demand on servers.

Data storage, including data stored in SANs, suffers from problems associated with data protection. If data is stored at a single location, that data is susceptible to loss in the event of damage to the storage device maintaining that data. System administrators, and SAN administrators in particular, have to confront the difficulty of protecting data on networks that include a large number of storage devices, and that may include a wide variety of different storage device types and manufactures, communication protocols, and other variations.

One solution to the problem of data protection is to store redundant copies of the data. For example, the data may be stored in a primary storage device, and again in a secondary storage device. In this manner, a localized disaster to one repository of the data will not affect the redundant copy. The maintenance of redundant copies of data presents its own difficulties, however. Such difficulties include keeping the redundant stores of data up-to-date in the face of updates to the data in primary storage (i.e., data synchronization), among others.

Therefore, in view of the above, what is needed is a system, method and computer program product for maintaining protection of data in a storage area network. Furthermore, what is needed is a system, method and computer program product for maintaining storage in redundant locations. Still further, what is needed is a system, method and computer program product for keeping data that is stored in redundant locations up-to-date, or synchronized.

SUMMARY OF THE INVENTION

A method, system, and computer program product for mirroring data in a computer network is described. At least one connection is established between a local storage server and a mirror storage server. A primary storage request is received from a network host at the local storage server. A mirror storage request is sent across the established at least one connection from the local storage server, wherein the mirror storage request corresponds to the received primary storage request. The mirror storage request is processed at the mirror storage server. A first heartbeat signal is sent from the local storage server to the mirror storage server. A second heartbeat signal is sent from the mirror storage server to the local storage server. Data of the received mirror storage request is stored in a mirror storage device corresponding to a primary storage device. A response is sent across the established at least one connection from the mirror storage server, wherein the response indicates whether the storing of data of the received mirror storage request step was successful.

In a further aspect of the present invention, an interruption may be detected in the second heartbeat signal at the local storage server. The established at least one connection is closed. Mirror storage requests are queued. The second heartbeat signal is received at the local storage server after the detected interruption of the second heartbeat signal. The closed at least one connection is re-established. The queued mirror storage requests are sent across the re-established at least one connection after the re-establishing step.

In a still further aspect of the present invention a method, system, and computer program product for bi-directional mirroring data in a computer network is described. A first connection between a local storage server and a remote storage server is established. A second connection between the local storage server and the remote storage server is established. A first local storage request from a first network host is received at the local storage server. A first local mirror storage request is sent from the local storage server across the first connection, wherein the first local mirror storage request corresponds to the first received local storage request. The first local mirror storage request is received at the remote storage server. Data received in the first local mirror storage request is stored in at least one remote storage device coupled to the remote storage server. A first remote storage request is received from a second network host at the remote storage server. A first remote mirror storage request is sent from the remote storage server across the second connection, wherein the first remote mirror storage request corresponds to the received first remote storage request. The first remote mirror storage request is received at the remote storage server. Data received in the first remote mirror storage request is stored in at least one local storage device coupled to the local storage server.

In a further aspect, a first heartbeat signal is sent from the local storage server to the mirror storage server. A second heartbeat signal is sent from the remote storage server to the local storage server. An interruption is detected in the second heartbeat signal at the local storage server. The established first connection is closed. At least a second local storage request is received at the local storage server. The at least a second local mirror storage request is queued at the local storage server. The second heartbeat signal is received at the local storage server after the detected interruption of the second heartbeat signal. The closed first connection is re-established between the local storage server and the mirror storage server. The queued at least a second local mirror storage requests is sent across the re-established first connection after the re-establishing step.

In a still further aspect, an interruption in the first heartbeat signal is detected at the remote storage server. The established second connection is closed. The at least a second remote storage request is received at the remote storage server. The at least a second remote mirror storage request is queued at the remote storage server. The first heartbeat signal is received at the remote storage server after the detected interruption of the first heartbeat signal. The closed second connection is re-established between the local storage server and the mirror storage server. The queued at least a second remote mirror storage requests are sent across the re-established second connection after the re-establishing step.

In a still further aspect, A method, system, and computer program product for mirroring data in a computer network is described. A local storage server receives a storage request and outputs a mirror storage request. The local storage server outputs a first heartbeat signal. A mirror storage server receives a mirror storage request. The mirror storage server processes the mirror storage request. The mirror storage server outputs a response corresponding to the mirror storage request to the local storage server. The mirror storage server outputs a second heartbeat signal and receives the first heartbeat signal. The local storage server receives the second heartbeat signal.

Further aspects of the present invention, and further features and benefits thereof, are described below. The accompanying drawings, which are incorporated herein and form a part of the specification, illustrate the present invention and, together with the description, further serve to explain the principles of the invention and to enable a person skilled in the pertinent art to make and use the invention.

BRIEF DESCRIPTION OF THE FIGURES

In the drawings, like reference numbers indicate identical or functionally similar elements. Additionally, the left-most digit(s) of a reference number identifies the drawing in which the reference number first appears.

The present invention will now be described with reference to the accompanying drawings.

DETAILED DESCRIPTION OF THE PREFERRED EMBODIMENTS

Overview

The present invention is directed to a method and system that provides for data mirroring. Data mirroring refers to the storage of identical data in more than one location. Data mirroring represents a way to protect data from localized disasters by retaining a redundant copy of primary storage data in a remote, secondary storage location. Data mirroring may be accomplished over long distances using TCP/IP over Ethernet, T1, T3, Gigabit Ethernet, or ATM. The present invention is particularly applicable to computer networks, including storage area networks, that include hosts, servers, and storage subsystems.

The present invention is further directed to a method and system for detecting network failures in a mirror storage configuration, and ensuring that data mirroring reliably occurs. The present invention detects when a network interruption occurs between primary and secondary storage. The present invention queues mirror storage requests during the period of interruption. When the network is restored, the queued mirror storage requests are executed, and the mirror storage configuration continues normal operation.

Figure 1:
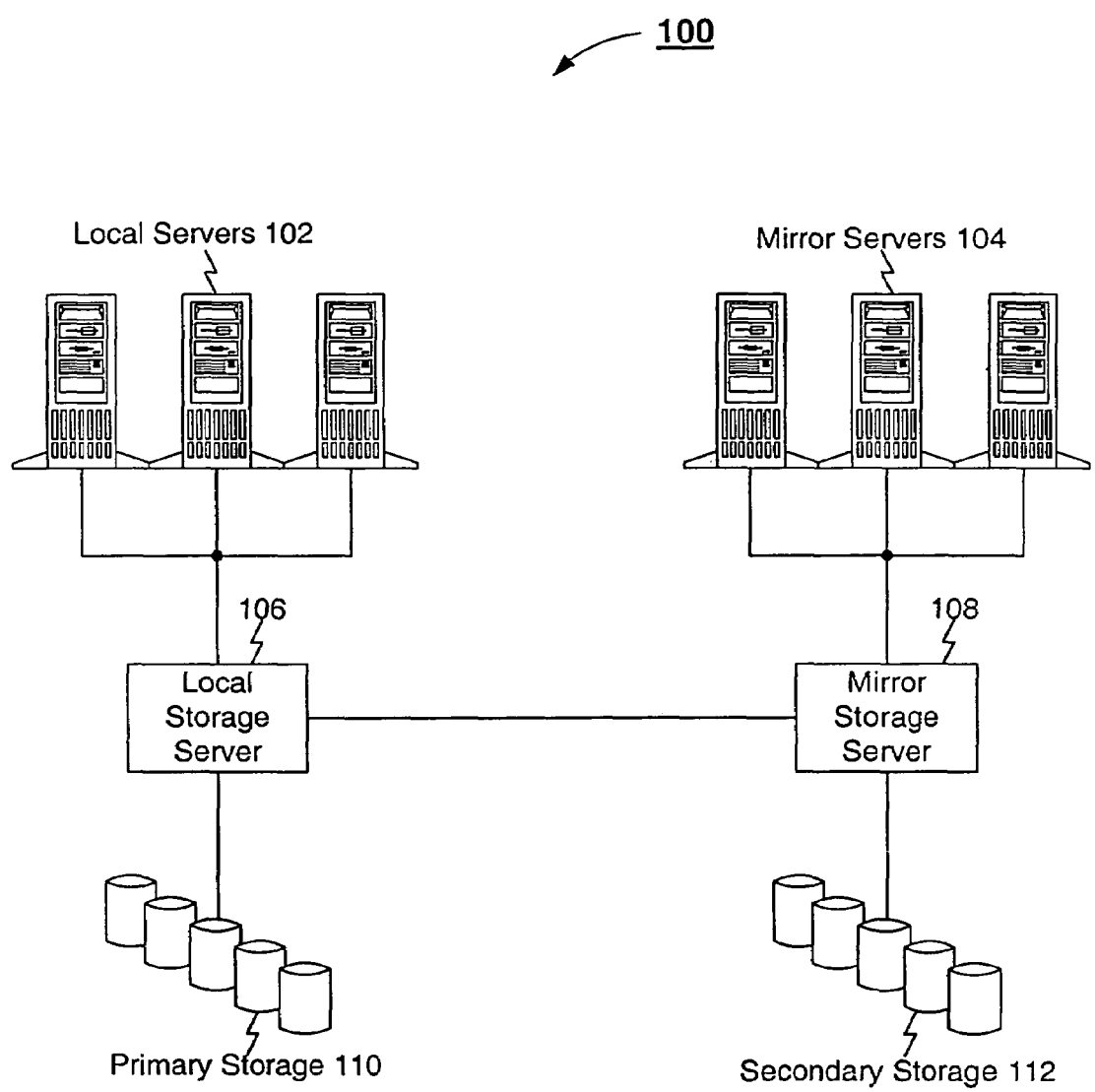
FIG. 1 illustrates an example storage mirror network configuration, according to embodiments of the present invention.

FIG. 1 illustrates an example storage mirror network configuration 100, according to embodiments of the present invention. Storage mirror network configuration 100 comprises local servers 102, mirror servers 104, a local storage server 106, a mirror storage 108, a primary storage 110, and a secondary storage 112. Generally, local storage server 106 receives data I/O requests from local servers 102, and issues the data I/O requests to primary storage 110. Local storage server 106 also forwards mirror data I/O requests to mirror storage server 108. Mirror storage server 108 issues the mirror data I/O requests to secondary storage 112. Mirror storage server 108 sends a reply or response to local storage server 106 that includes information, such as whether the mirror data I/O request was successfully executed in secondary storage 112. Mirror servers 104 may be used as file servers for secondary storage 112.

Local servers 102 and mirror servers 104 each include one or more hosts or servers that may be present in a data communication network. Servers 102 and 104 manage network resources. For instance, one or more of the servers of servers 102 and 104 may be file servers, network servers, application servers, database servers, or other types of server. Servers 102 and 104 may comprise single processor or multi-processor servers. Mirror servers 104 may also be referred to as remote servers. Servers 102 and 104 process requests for data and applications from networked computers, workstations, and other peripheral devices otherwise known or described elsewhere herein. Servers 102 and 104 output requests to local storage server 106 and mirror storage server 108, respectively, to write to, or read data from primary storage 110 and secondary storage 112.

Local storage server 106 receives storage read and write requests from local servers 102. Local storage server 106 outputs the storage read and write requests to the physical storage devices in primary storage 110. Local storage server 106 also sends storage read and write requests to mirror storage 108. In particular, local storage server 106 sends storage write requests to mirror storage server 108 so that mirror storage server 108 may update data stored in secondary storage 112 to match or mirror that of primary storage 110. Local storage server 106 sends these storage requests to mirror storage server 108 as they are received. This allows for substantially concurrent data storage in primary storage 110 and secondary storage 112 at any given time. Mirror storage server 108 sends a response to local storage server 106 to indicate whether the data was written to secondary storage 112 successfully. Mirror storage server 108 may also be referred to as a remote storage server. Local storage server 106 and mirror storage server 108 each also monitor the connection between them for network outages. If the connection to the opposite server is lost, mirror storage requests are queued by local storage server 106, and/or responses are queued by mirror storage server 108. The queued requests and/or responses are forwarded to the respective server when the network is restored.

Primary storage 110 and secondary storage 112 receive storage read and write requests from local storage server 106 and mirror storage server 108, respectively. Primary storage 110 and secondary storage 112 route the received storage read and write requests to the corresponding storage device(s), which respond by reading or writing data as requested. Primary storage 110 and secondary storage 112 each comprise one or more storage devices that may be directly coupled to local storage server 106 or mirror storage server 108, respectively, and/or may be interconnected in storage area network configurations that are coupled to local storage server 106 and mirror storage server 108. For example, primary storage 110 and secondary storage 112 may each comprise one or more of a variety of storage devices or LUNs (logic unit numbers), including tape systems, JBODs (Just a Bunch Of Disks), floppy disk drives, optical disk drives, disk arrays, and other applicable types of storage devices otherwise known or described elsewhere herein. Storage devices in primary storage 110 and secondary storage 112 may be interconnected via SCSI or fibre channel links, or other types of links, in a variety of topologies. Example topologies for primary storage 110 and secondary storage 112 are more fully described below. Secondary storage 112 may also be referred to as remote storage, or redundant storage.

In further embodiments of the present invention, mirror storage server 108 may operate as a primary storage server that mirrors storage requests. In other words, mirror storage server 108 may operate as a local storage server for mirror servers 104 and secondary storage 112, for purposes of mirroring data stored in secondary storage 112. For example, in embodiments, mirror storage server 108 receives data I/O requests from mirror servers 104, and issues the data I/O requests to secondary storage 112. In such a configuration, secondary storage 112 operates as primary storage. Mirror storage server 108 forwards mirror data I/O requests to local storage server 106. In such a configuration, local storage server 106 operates as a mirror storage server. Local storage server 106 issues the mirror data I/O requests to primary storage 110. Local storage server 106 sends a reply or response to mirror storage server 108 that includes information, such as whether the mirror data I/O request was successfully executed in primary storage 110.

In other words, in embodiments, local storage server 106 can mirror storage requests received from local servers 102, while mirror storage server 108 simultaneously mirrors storage requests received from mirror servers 104. Secondary storage 112 acts as redundant storage for local servers 102, while primary storage 110 acts as redundant storage for mirror servers 104. For instance, half of the storage space of primary storage 110 may be allocated as primary storage for local servers 102, and half may be allocated as redundant storage for mirror servers 104. Likewise, half of the storage space of secondary storage 112 may be allocated as primary storage for mirror servers 104, and half may be allocated as redundant storage for local servers 102. In embodiments, the primary and redundant storage space allocations may or may not be divided equally in primary storage 110 and/or in secondary storage 112, and can be divided according to any proportions.

Operation of mirror storage server 108 as a local storage server 106 is analogous to operation of local storage server 106 as such, as described herein. The discussion herein focuses primarily on operation of local storage server 106 as the primary storage server and mirror storage server 108 as the redundant storage server. However, the discussion of local storage server 106 as a primary storage server is also applicable to the operation of mirror storage 108 as a primary storage server, and the discussion of mirror storage server 108 as the redundant storage server is applicable to the discussion of local storage server 106 as the redundant storage server.

Figure 2A:
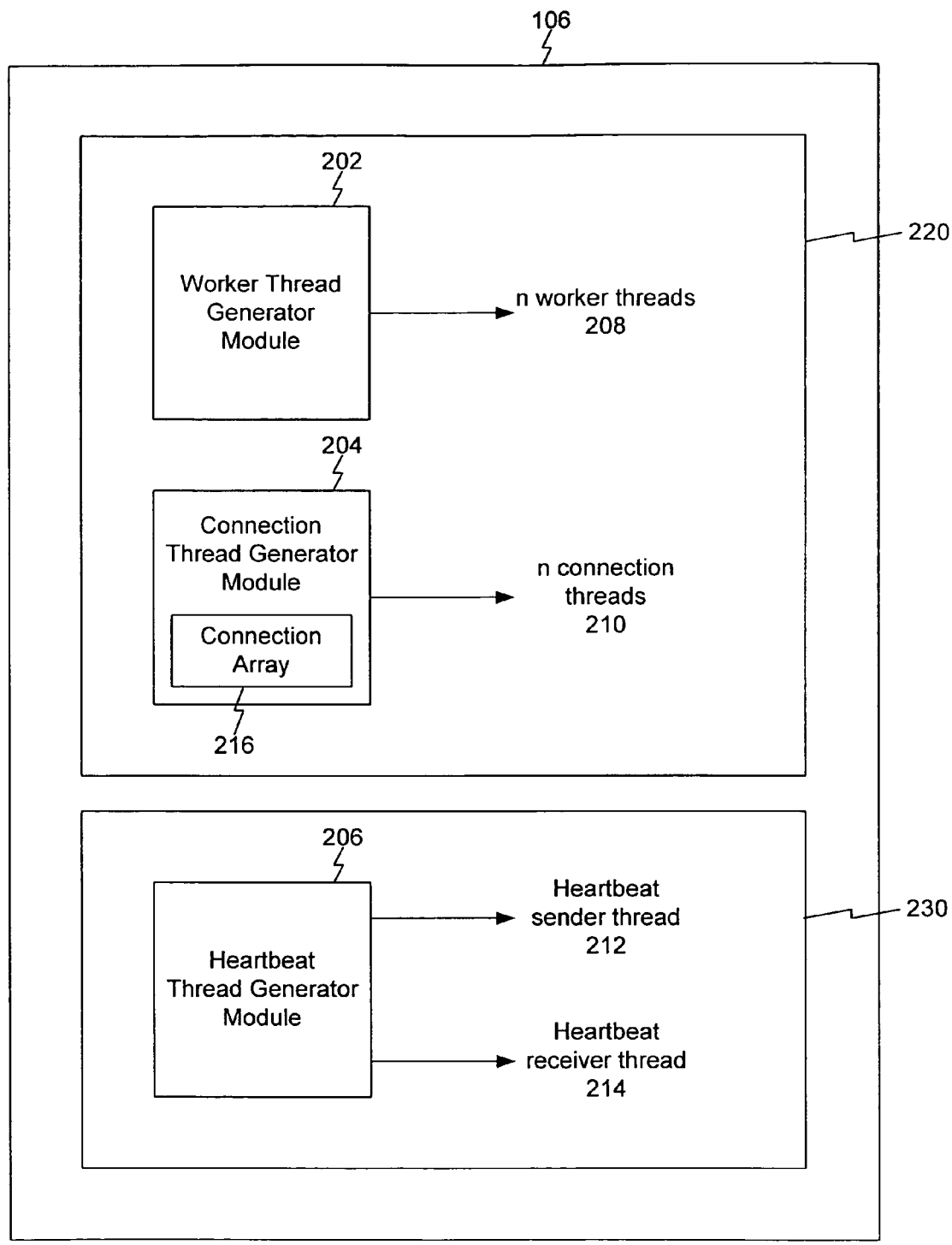
FIG. 2A illustrates an exemplary block diagram for a storage server, according to the present invention.
Figure 2B:
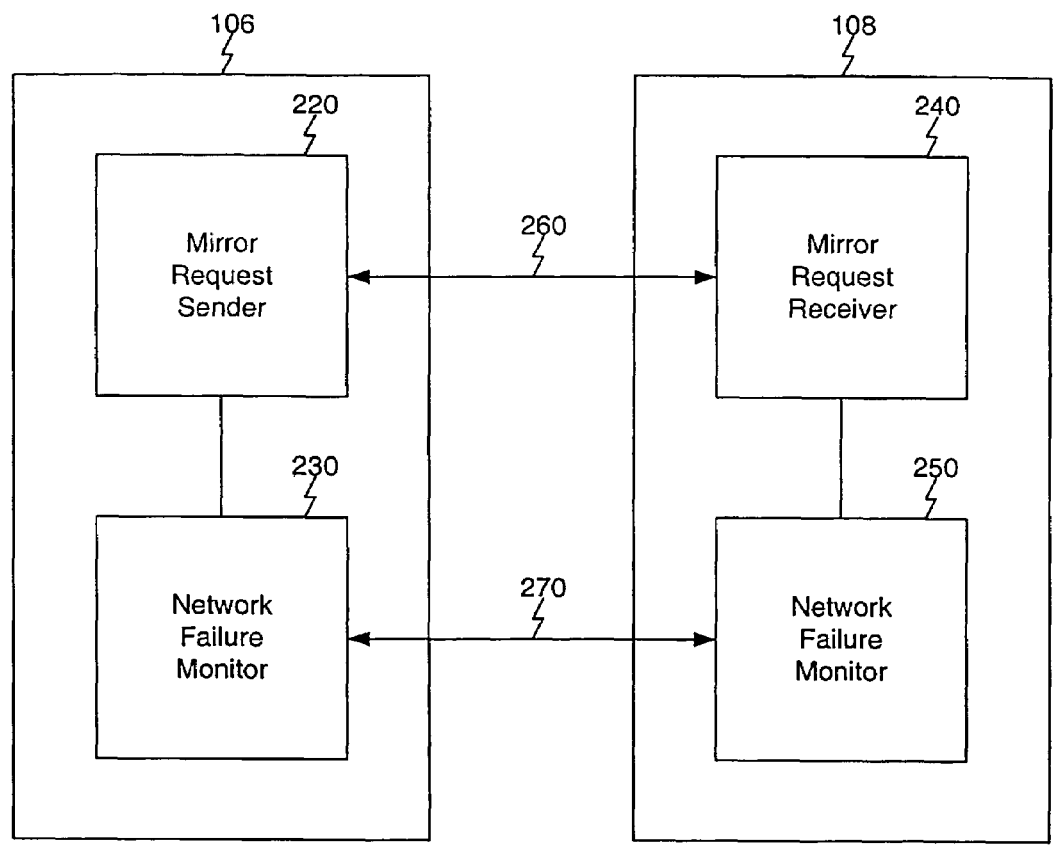
FIG. 2B illustrates an exemplary block diagram configuration of a local storage server and mirror storage server, according to an embodiment of the present invention.

FIG. 2B illustrates an exemplary block diagram configuration of local storage server 106 and mirror storage server 108, according to an embodiment of the present invention. Local storage server 106 comprises a mirror request sender 220 and a first network failure monitor 230. Mirror storage server 108 comprises a mirror request receiver 240 and a second network failure monitor 250.

Mirror request sender 220 receives data storage requests from local servers 102, and forwards them to mirror request receiver 240 for mirror storage by mirror storage server 108, via connection 260. For instance, a polling process or thread in local storage server 106 may poll for storage requests from local servers 102. The polling process may then forward the storage requests to subsequent worker threads or processes in local storage server 106. The worker threads or processes perform the actual write to primary storage 110, and forward the storage requests to mirror request sender 220 for mirroring.

Mirror request receiver 240 receives the mirror storage requests, and forwards them to secondary storage 112 for storage. Mirror request receiver 240 may receive an indication from secondary storage 112 whether the storage operation was successful, and then send this indication to mirror request sender 220 as a reply or response via connection 260.

First network failure monitor 230 and second network failure monitor 250 each generate a health signal, which they forward to each other via second path 270. The health signal output by first network failure monitor 230 allows local storage server 106 to notify mirror storage server 108 that local storage server 106 is operating. Hence, mirror request sender 220 may send mirror storage requests to, and receive responses from mirror request receiver 240. The health signal output by second network failure monitor 250 allows mirror storage server 108 to communicate to local storage server 106 that it is operating, and that mirror request receiver 240 is ready to receive mirror storage requests, and to send responses.

In the event of a network interruption, one or both of first and second network failure monitors 230 and 250 may not receive a health signal from the other network failure monitor. If first network failure monitor 230 does not receive a health signal, it will indicate to mirror request sender 220 to stop sending mirror storage requests to mirror request receiver 240, and to begin queuing the requests. If second network failure monitor 250 does not receive a health signal, it will indicate to mirror request receiver 240 to stop sending responses, and to begin queuing them. Once a health signal is reestablished, the respective network failure monitor will signal to mirror request sender 220 or mirror request receiver 240 to send the mirror storage requests or responses in the respective queues, and to begin to send new mirror storage requests, or responses, respectively.

The present invention can be implemented in and operated from a SAN device or appliance that interfaces between the hosts and the storage subsystems comprising the SAN. For example, local storage server 106 may be a first SAN device or appliance that is an interface between local servers 102 and primary storage 110. Mirror storage server 108 may be a second SAN device or appliance that is an interface between mirror servers 104 and secondary storage 112.

The invention has the advantage of being completely host (operating system) independent and storage system independent. Conventional data mirroring functionality is primarily found on hosts or storage subsystems, not on independent network servers that manage a storage network. As a result, remote data mirroring for risk reduction purposes requires a large investment in storage array hardware, or in cumbersome host software, as well as causing a significant performance penalty.

Unlike conventional host-based remote mirroring solutions, the present invention does not require additional host software, and is compatible with all hosts. The invention is completely transparent so there is no need to manage mirroring from individual hosts. Instead, for example, an Internet or other network accessible graphical user interface may centrally manage mirroring for the entire SAN.

Unlike storage array-based mirroring solutions, the present invention is not tied to a specific storage vendor, and operates with any type of attached storage. For example, the present invention operates with fibre channel storage devices. The invention obviates the need to invest in dedicated storage hardware for the sole purpose of remote mirroring.

Description in these terms is provided for convenience only. It is not intended that the invention be limited to application in this example environment. In fact, after reading the following description, it will become apparent to a person skilled in the relevant art how to implement the invention in alternative environments known now or developed in the future. Further detailed embodiments of the elements of storage mirror network configuration 100 are discussed below.

Terminology related to the present invention is described in the following section. Embodiments for the local storage server and mirror storage server are then provided. Establishment of the mirroring system is discussed in the subsequent section. The mirroring of data is then presented, followed by configuration of the system heartbeat. This is followed by example operational embodiments of the present invention. Exemplary storage area network implementations of the storage mirror of the present invention are then presented, followed by discussion of application of the present invention in a SAN appliance. Finally, an exemplary computer system in which the present invention may be implemented is described.

Terminology

To more clearly delineate the present invention, an effort is made throughout the specification to adhere to the following term definitions as consistently as possible.

Arbitrated A shared 100 MBps Fibre Channel transport supporting up to Loop 126 devices and 1 fabric attachment.

Fabric One or more Fibre Channel switches in a networked topology.

HBA Host bus adapter; an interface between a server or workstation bus and a Fibre Channel network.

Hub In Fibre Channel, a wiring concentrator that collapses a loop topology into a physical star topology.

Initiator On a Fibre Channel network, typically a server or a workstation that initiates transactions to disk or tape targets.

JBOD Just a bunch of disks; typically configured as an Arbitrated Loop segment in a single chassis.

LAN Local area network; a network linking multiple devices in a single geographical location.

Logical The entity within a target that executes I/O commands. For Unit example, SCSI I/O commands are sent to a target and executed by a logical unit within that target. A SCSI physical disk typically has a single logical unit. Tape drives and array controllers may incorporate multiple logical units to which I/O commands can be addressed. Typically, each logical unit exported by an array controller corresponds to a virtual disk.

LUN Logical Unit Number; The identifier of a logical unit within a target, such as a SCSI identifier.

Point-to- A dedicated Fibre Channel connection between two devices. point

Private A free-standing Arbitrated Loop with no fabric attachment. loop

Public loop An Arbitrated Loop attached to a fabric switch.

RAID Redundant Array of Independent Disks.

SCSI Small Computer Systems Interface; both a protocol for transmitting large blocks of data and a parallel bus architecture.

SCSI-3 A SCSI standard that defines transmission of SCSI protocol over serial links.

Storage Any device used to store data; typically, magnetic disk media or tape.

Switch A device providing full bandwidth per port and high-speed routing of data via link-level addressing.

Target Typically a disk array or a tape subsystem on a Fibre Channel network.

TCP Transmission Control Protocol; TCP enables two hosts to establish a connection and exchange streams of data; TCP guarantees delivery of data and also guarantees that packets will be delivered in the same order in which they were sent.

Topology The physical or logical arrangement of devices in a networked configuration.

UDP User Datagram Protocol; a connectionless protocol that, like TCP, runs on top of IP networks. Unlike TCP/IP, UDP/IP provides very few error recovery services, offering instead a direct way to send and receive datagrams over an IP network.

WAN Wide area network; a network linking geographically remote sites.

Local and Mirror Server Embodiments

Structural implementations for the mirror storage configuration of the present invention are described at a high-level and at a more detailed level. These structural implementations are described herein for illustrative purposes, and are not limiting. In particular, the present invention as described herein can be achieved using any number of structural implementations, including hardware, firmware, software, or any combination thereof. For instance, the present invention as described herein may be implemented in one or more computer systems, application-specific boxes, or other devices. In an embodiment, the present invention may be implemented with a pair of SAN appliances, which provides for an interface between host servers and storage. Such SAN appliances include the SANLink™ appliance, developed by StorageApps Inc., located in Bridgewater, N.J.

FIG. 2A illustrates an exemplary block diagram for local storage server 106, according to embodiments of the present invention. Local storage server 106 comprises mirror request sender 220 and network failure monitor 230. Mirror request sender comprises a worker thread generator module 202 and a connection thread generator module 204. First network failure monitor 230 comprises a heartbeat thread generator module 206. These modules may be implemented in software, hardware, firmware, or any combination thereof.

The block diagram embodiment for local storage server 106 shown in FIG. 2A is also substantially applicable to mirror storage server 108 of FIG. 2B. In an embodiment, mirror request receiver 240 comprises a worker thread generator module 202 and a connection thread generator module 204, and second network failure monitor 250 comprises a heartbeat thread generator module 206. These modules in mirror storage server 108 are substantially structurally and operationally similar to those in local storage server 106. The discussion below focuses mainly on these modules in local storage server 106, but the discussion is also applicable to these modules in mirror storage server 108.

In embodiments, local storage server 106 and mirror storage server 108 perform mirroring functions using these modules. These modules are described in more detail as follows.

As shown in FIG. 2A, worker thread generator module 202 generates n worker threads 208. In an embodiment, a worker thread is an element of a process for performing specific local processing functions. For example, each of the n work threads 208 may process a SCSI-based IP Mirroring request from a host, and send the results back to that host. Each of the n worker threads 208 may execute instructions concurrently with other threads. The number n of worker threads generated is determined on an application basis, and may be any number.

Connection thread generator module 204 comprises a connection array 216. Connection array 216 comprises an array of n of elements. Each element of connection array 216 corresponds to one of the n worker threads 208. In an embodiment, each of the n elements includes a socket, a timestamp parameter, and other information, such as a status parameter. The functions of these elements will be further described below.

Connection thread generator module 204 generates n connection threads 210. Each thread of n connection threads 210 corresponds to one of the n worker threads 208. Each thread of n connection threads 210 is generated according to information stored in the corresponding element of connection array 216. In an embodiment, the n connection threads 210 in mirror request receiver 240 are generated to receive storage mirroring requests from n worker threads 208 of mirror request sender 220. The n connection threads 210 in mirror request sender 220 are generated to receive storage mirroring requests from n worker threads 208 of mirror request receiver 240. The n connection threads 210 accept the mirror storage requests from their corresponding n worker threads 208. The functions of n connection threads 210 will be further described below.

Heartbeat thread generator module 206 generates a heartbeat sender thread 212 and a heartbeat receiver thread 214. Both heartbeat sender thread 212 and heartbeat receiver thread 214 are dormant if the mirroring function is not engaged. When the mirroring function is engaged, heartbeat sender thread 212 generates a heartbeat signal, which is received by heartbeat receiver thread 214 on the opposite server. Heartbeat sender thread 212 and heartbeat receiver thread 214 allow the storage mirror to determine whether a remote network (i.e., local storage server 106, mirror storage server 108, or physical network) is "alive." The functions of heartbeat sender thread 212 and heartbeat receiver thread 214 will be further described below.

The embodiments for the storage mirror of the present invention described above are provided for purposes of illustration. These embodiments are not intended to limit the invention. Alternate embodiments, differing slightly or substantially from those described herein, will be apparent to persons skilled in the relevant art(s) based on the teachings contained herein.

Establishing the Mirroring System of the Present Invention

Figure 3:
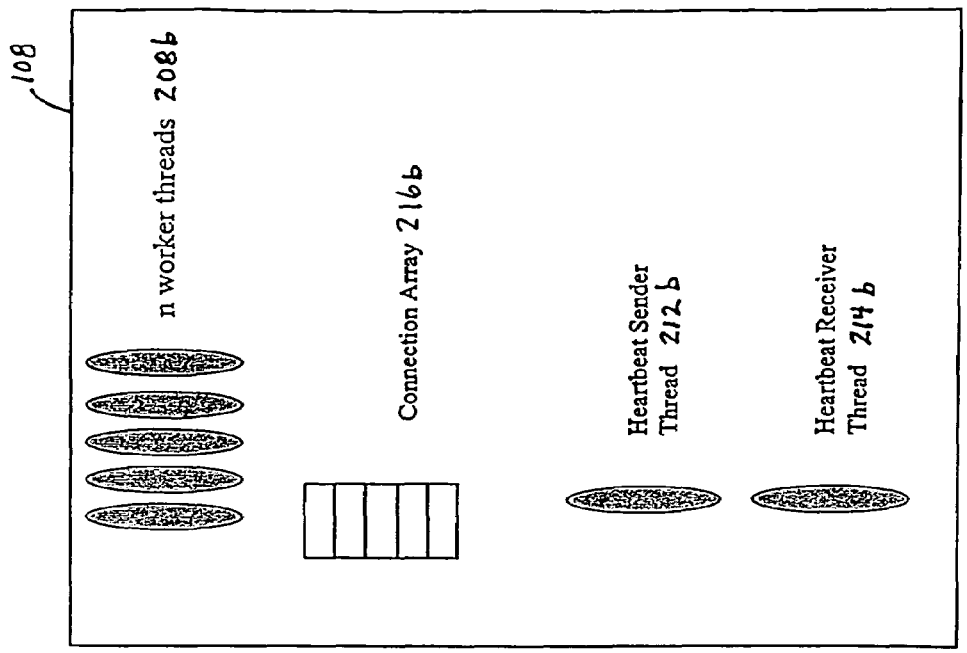
FIG. 3 illustrates an implementation of a local storage server and a mirror storage server prior to the initiation of mirroring, according to an embodiment of the present invention.
Figure 3:
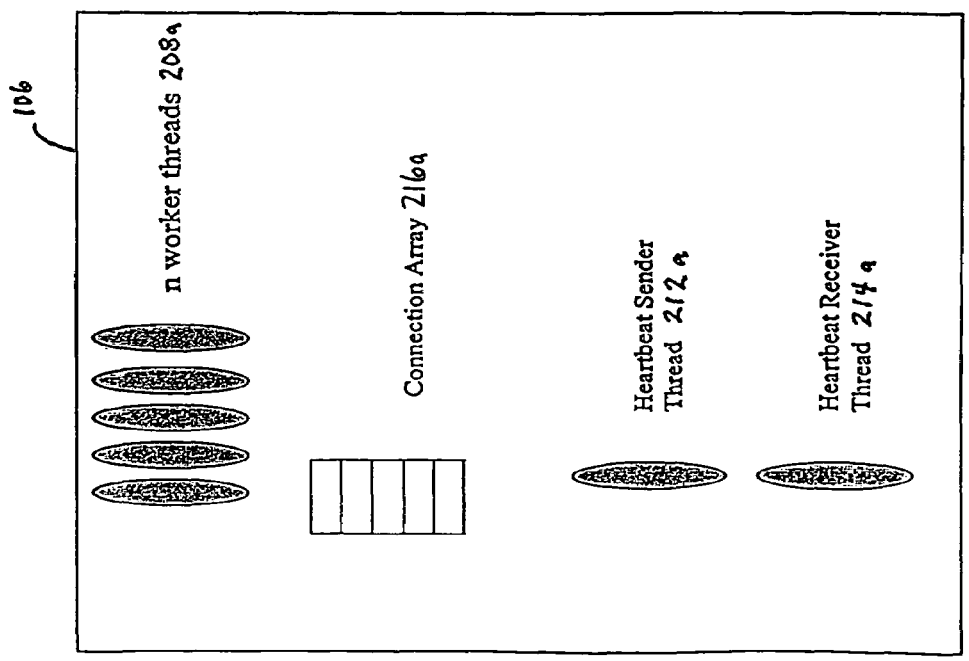

FIG. 3 illustrates an implementation of local storage server 106 and mirror storage server 108 prior to the initiation of mirroring, according to an embodiment of the present invention. Essentially, FIG. 3 illustrates the invention in a "dormant" mirroring state. In FIG. 3, local storage server 106 comprises n worker threads 208a, connection array 216a, heartbeat sender thread 212a, and heartbeat receiver thread 214a. Mirror storage server 108 comprises n worker threads 208b, connection array 216b, heartbeat sender thread 212b, and heartbeat receiver thread 214b.

Figure 4:
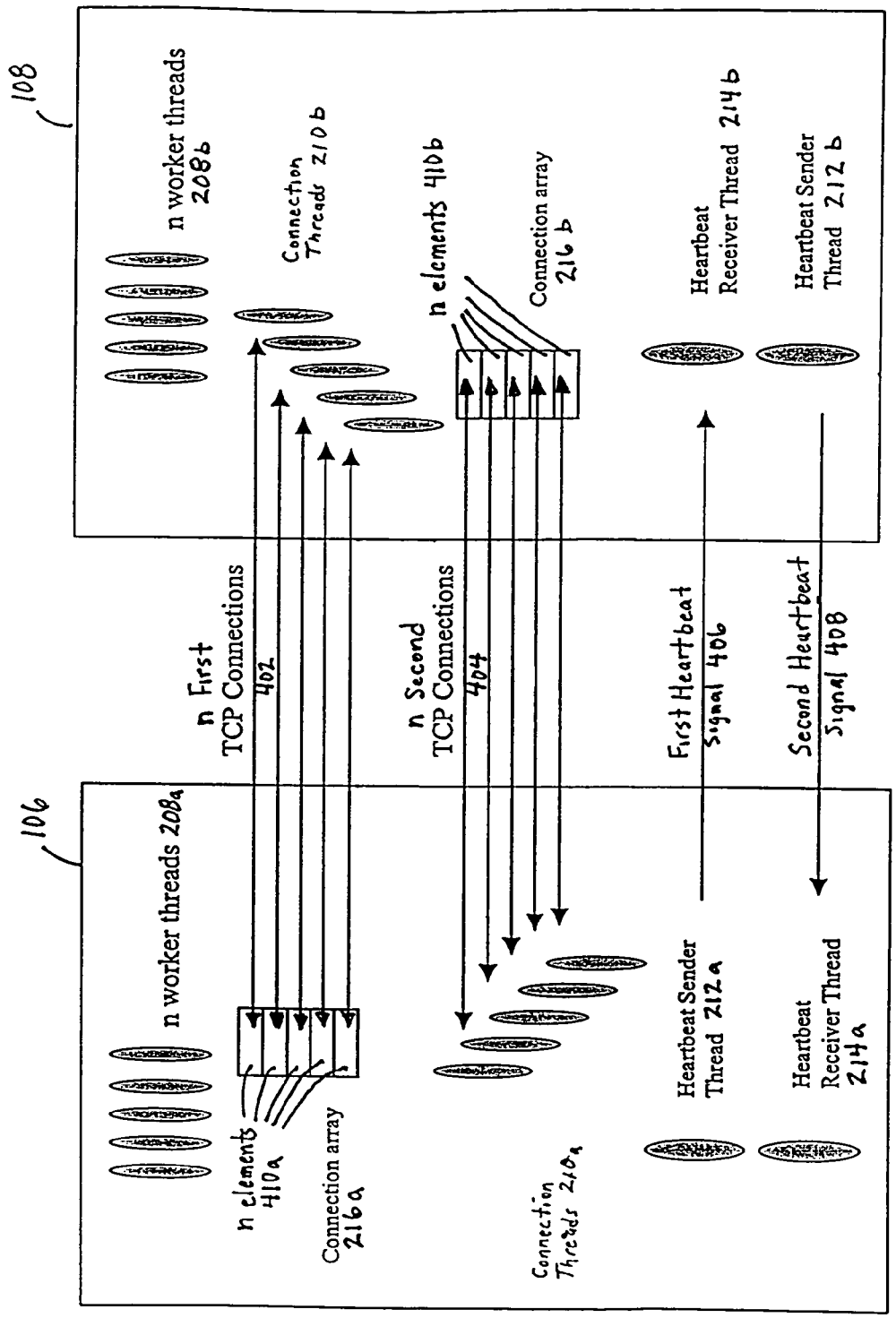
FIG. 4 illustrates an implementation of the local storage server and mirror storage server of FIG. 3 after the establishment of active storage mirroring, according to an embodiment of the present invention.

FIG. 4 illustrates an implementation of local storage server 106 and mirror storage server 108 of FIG. 3 after the establishment of active storage mirroring, according to an embodiment of the present invention. FIG. 4 illustrates an embodiment where mirroring of data may occur in both directions. In other words, local storage server 106 may send mirror storage requests from local servers 102 to mirror storage server 108, and mirror storage server 108 may send mirror storage requests from mirror servers 104 to local storage server 106. The present invention is applicable to one-way and two-way mirroring, and further configurations.

In a preferred embodiment, when a storage mirror is defined, local storage server 106 establishes n first TCP (Transmission Control Protocol) connections 402 with mirror storage server 108. Connection array 216a comprises n elements 410a. The n first TCP connections 402 are established by connecting each socket stored in the n elements 410a of connection array 216a with one of n connection threads 210b. Mirror storage server 108, in turn, establishes n second TCP connections 404 with local storage server 106 by connecting each socket stored in the n elements 410b of connection array 216b with one of n connection threads 210a. In a preferred embodiment, storage requests are sent, and responses are received according to Internet protocol (IP). Connection protocols other than TCP, and data protocols other than IP are also within the scope and spirit of the present invention.

Once n first and n second TCP connections 402 and 404 are established, local storage server 106 and mirror storage server 108 operate to mirror storage requests. This mirroring function is described further in the following section.

In a preferred embodiment, when health monitor functionality is engaged, heartbeat sender threads 212a and 212b send a UDP (User Datagram Protocol) message on a first heartbeat signal 406 and a second heartbeat signal 408, respectively, at regular intervals, to the heartbeat receiver threads 214b and 214a, respectively, on the opposite server. This allows the opposite server to determine whether the heartbeat sending server is active. UDP has the advantage of not requiring a constant signal connection between sender and receiver. Other applicable message protocols are also within the scope and spirit of the present invention.

Mirroring Data According to the Present Invention

Figure 6:
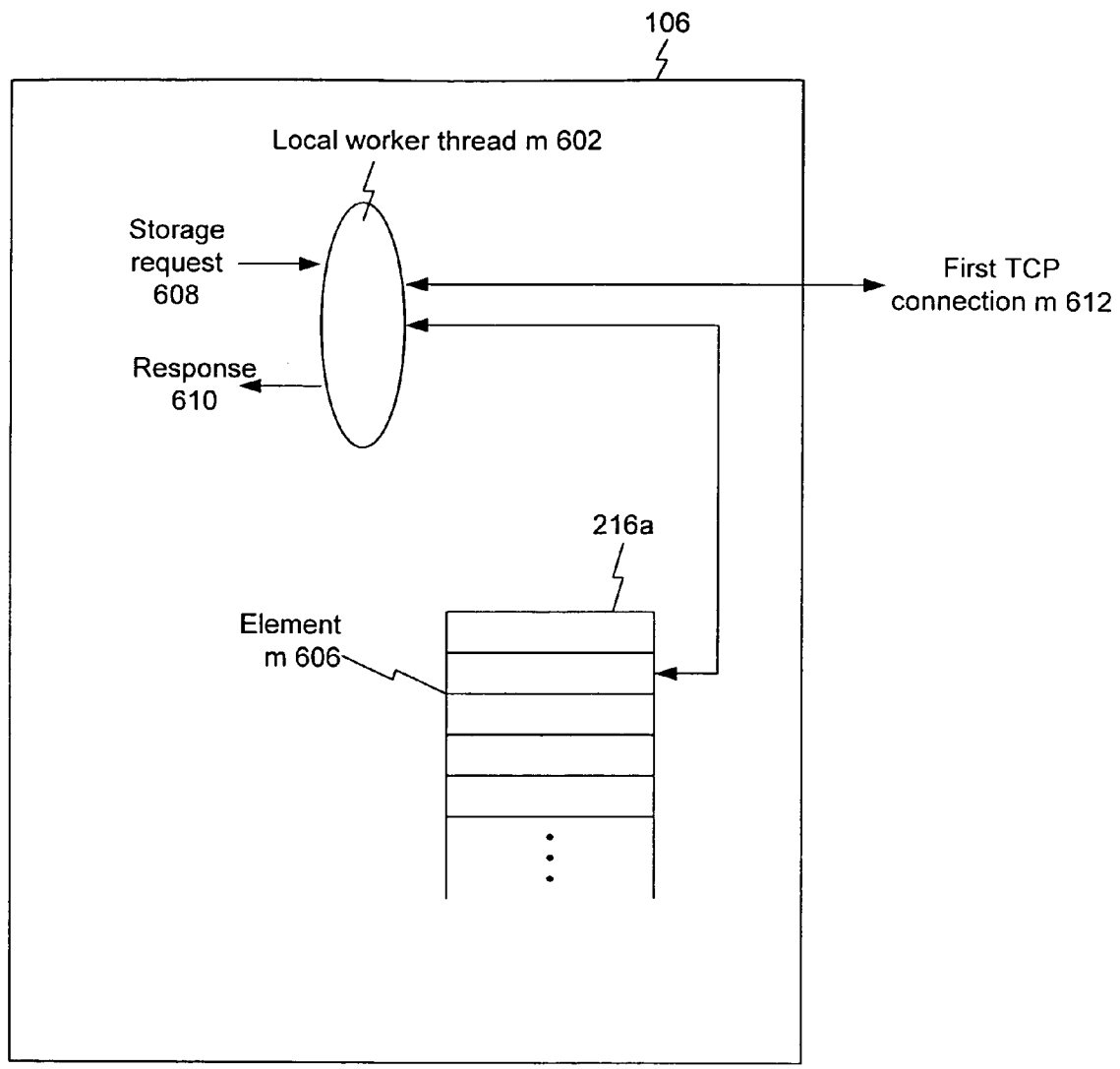
FIG. 6 illustrates an example implementation of a local storage server for processing mirror storage requests, according to an embodiment of the present invention.

After the IP Mirror connections are established, the worker threads on the local server process mirroring requests from hosts. For instance, the worker threads may process SCSI-based IP mirroring requests from the host. FIG. 6 illustrates an example implementation of local storage server 106 for processing mirror storage requests, according to an embodiment of the present invention. The discussion below in reference to FIG. 6 and FIG. 7 focuses on one-way, or unidirectional storage mirroring, where local storage server 106 sends mirror storage requests from local servers 102 to mirror storage server 108. The present invention as described herein, however, is also applicable to two-way, or bidirectional storage mirroring, where mirror storage server 108 also sends mirror storage requests from mirror servers 104 to local storage server 106.

In FIG. 6, a local worker thread m 602 receives a storage request 608. Storage request 608 includes data and storage location information for storing the data in storage. Local worker thread m 602 outputs a mirror storage request for storage request 608 on a first TCP connection m 612. First TCP connection m 612 was established by connecting the socket stored in an element m 606 of connection array 216a with a connection thread operating in mirror storage server 108.

Figure 7:
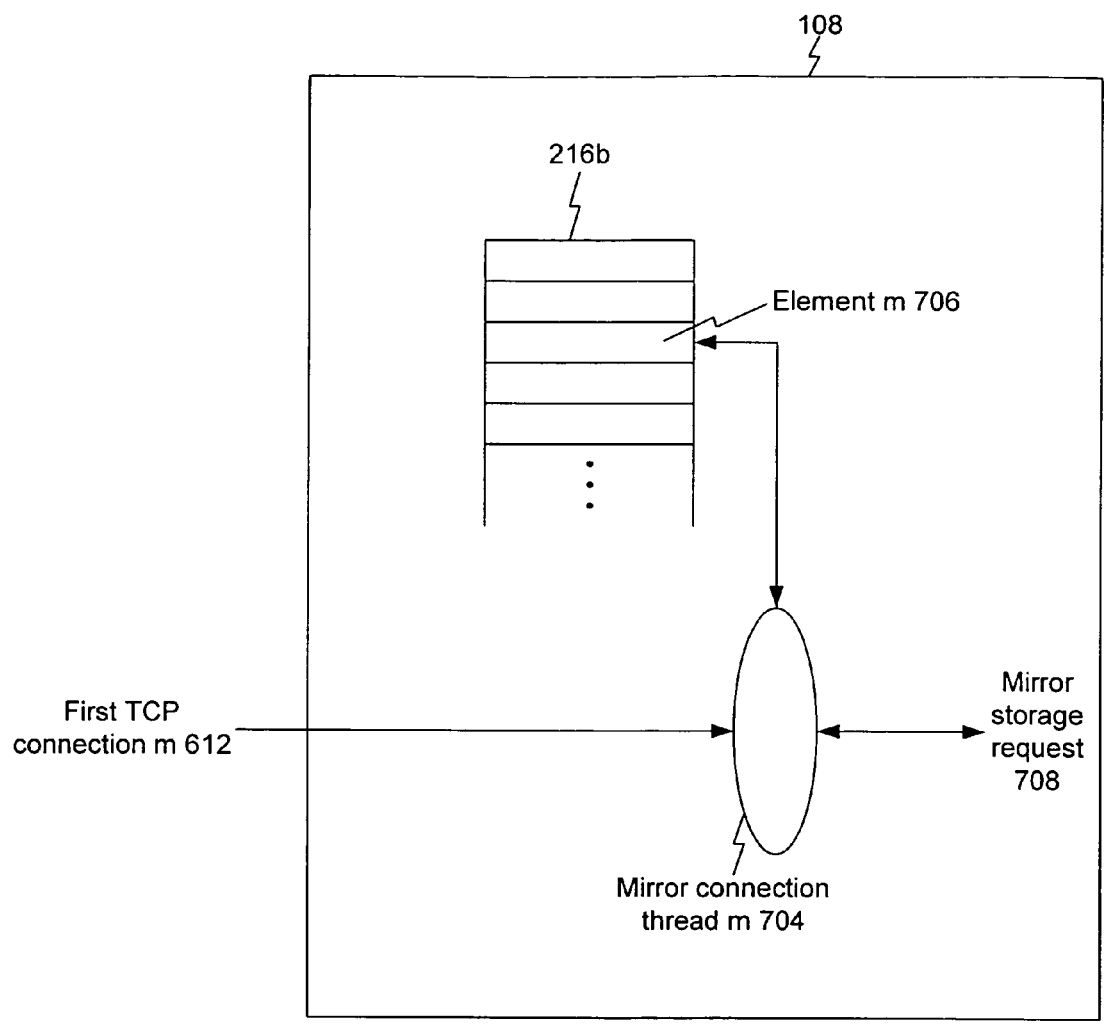
FIG. 7 illustrates an example implementation of a mirror storage server for processing mirror storage requests, according to an embodiment of the present invention.

FIG. 7 illustrates an example implementation of mirror storage server 108 for processing mirror storage requests, according to an embodiment of the present invention. FIG. 7 shows a mirror connection thread m 704 that receives first TCP connection m 612. In an embodiment, mirror connection thread m 704 processes the mirror request storage received on first TCP connection m 612, by storing the data affiliated with storage request 608 in mirror or secondary storage. Mirror connection thread m 704 sends the data affiliated with storage request 608 to secondary storage via mirror storage request 708.

Mirror connection thread m 704 times out periodically, if mirror requests are not received on first TCP connection m 612 after a predetermined amount of time. When this happens, mirror connection thread m 704 checks an element m 706 in connection array 216b to determine whether first TCP connection m 612 has been closed. In an embodiment, element m 706 includes a status parameter. The status parameter indicates whether first TCP connection m 612 is closed or open. The status parameter may be modified by a heartbeat sender thread 212 to indicate a closed or open condition for first TCP connection m 612, as described in the text below with respect to FIG. 5. If mirror connection thread m 704 determines from the status parameter in element m 706 that first TCP connection m 612 is closed, mirror connection thread m 704 closes its connection and exits. If mirror connection thread m 704 determines that first TCP connection m 612 is open, mirror connection thread m 704 will reinitiate monitoring of first TCP connection m 612.

Mirror connection thread m 704 receives a response via mirror storage request 708 from secondary storage as to whether the data affiliated with storage request 608 was successfully mirrored, or stored in secondary storage. Mirror connection thread m 704 sends this response to local storage server 106 on first TCP connection m 612.

The response from mirror storage server 108 is received by local worker thread m 602 on first TCP connection m 612. Local worker thread m 602 outputs the response as response 610.

Worker threads can process mirroring requests both asynchronously and synchronously. In an asynchronous mirroring mode, local worker thread m 602 processes the request to store data to primary storage (for example, a SCSI request), sends the result to the requesting host, and then waits for a response from mirror storage server 108 as to the success of mirror storage of the data. In a synchronous mirroring mode, local worker thread m 602 processes the request to store data to primary storage, and waits for a response from mirror storage server 108 before sending the results of the primary storage request to the host.

Description of data mirroring in these terms is provided for convenience only. It is not intended that the invention be limited to application in this example environment. In fact, after reading the description herein, it will become apparent to a person skilled in the relevant art how to implement the invention in alternative environments known now or developed in the future.

Network Failure Detector/Health Monitor of the Present Invention

Figure 5:
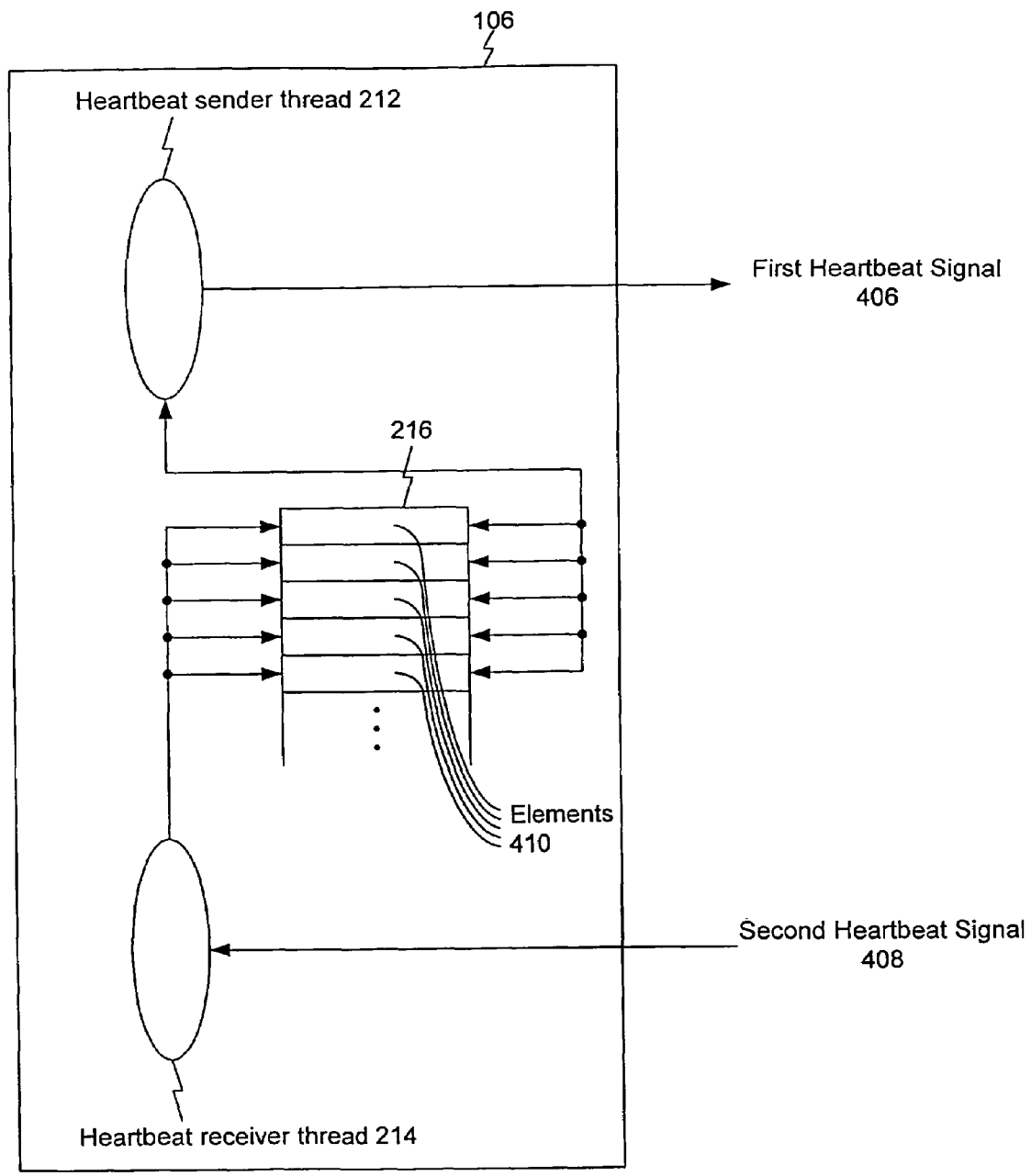
FIG. 5 illustrates an example health monitor implementation, according to an embodiment of the present invention.

FIG. 5 illustrates an example health monitor implementation in local storage server 106, according to an embodiment of the present invention. The health monitor implementation for local storage server 106 of FIG. 5 is also applicable to mirror storage server 108. In embodiments, the health monitor implementations for local storage server 106 and mirror storage server 108 interact to detect network failures and to monitor the health of the complete storage mirror implementation.

In FIG. 5, heartbeat sender thread 212 sends messages on first heartbeat signal 406 to the heartbeat receiver thread at the opposite server, at predetermined time intervals. For example, in an embodiment, heartbeat sender thread 212 may send UDP messages on first heartbeat signal 406 every 1.5 seconds. After sending a UDP message, heartbeat sender thread 212 checks each element of connection array 216. In FIG. 5, connection array 216 includes elements 410. If the timestamp parameter of an element of connection array 216 is "old", i.e., contains a value of time greater than a predetermined time amount, a heartbeat sender thread 212 enters the status parameter of the element as "down" and closed. For example, in an embodiment, connection array 216 may indicate an element as down and closed if the timestamp parameter is older than 4 seconds. Other time amounts are applicable to the present invention.

Heartbeat receiver thread 214 receives second heartbeat signal 408 from the heartbeat sender thread at the opposite server at the above described predetermined time intervals. In an embodiment, heartbeat receiver thread 214 remains dormant while it waits for a UDP message from the heartbeat sender thread of the other server. When a UDP message arrives on second heartbeat signal 408, heartbeat receiver thread 214 updates or resets the timestamp parameter on each element of connection array 216.

As described in the previous section with respect to FIGS. 6 and 7, a connection thread times out if a request from the opposite server has not arrived. Upon such a timeout, the connection thread checks the status parameter of the corresponding element of connection array 216 to see if the connection has been marked down. If so, the connection thread closes its connection and exits.

After a connection breaks (e.g., due to a disaster affecting a server or network), local storage server 106 and/or mirror storage server 108 no longer receives UDP messages from the other server, which causes the timestamp parameters of each element of connection array 216 to expire. Once this occurs, (a) the heartbeat sender thread of the operating server closes all connections in connection array 216, (b) the connection threads of the operating server close the corresponding connections and exit, and (c) the heartbeat sender thread of the operating server continues to send UDP messages to the opposite server at the rate of the predetermined time interval.

In a preferred embodiment, after such an interruption, when heartbeat receiver thread 214 on the operating server receives the next UDP message, it starts a timer corresponding to a probationary interval. If the heartbeat receiver thread 214 continues to receive UDP packets during the duration of the probationary interval without interruption, the operating server reestablishes all connections in connection array 216. To reestablish the connections, each status parameter is modified to indicate the connection is "up" or open, and the connections are considered to be operating again. If the heartbeat receiver experiences an interruption during the probationary interval, the timer is restarted upon receipt of the next UDP message. For example, in an embodiment, heartbeat receiver thread 214 may set the probationary interval to a value of 10 seconds. The probationary interval effectively prevents the reestablishment of connections until the network has reached a stable state. In alternative embodiments, connections may be reestablished upon the receipt of the first UDP message, without a probationary interval.

In an embodiment, a local worker thread can determine that its corresponding connection is down by checking the status parameter of the corresponding element of connection array 216 to see if the connection has been marked down. For instance, the local worker thread may check the status parameter of the corresponding element of connection array 216 before attempting to send a mirror storage request.

Figure 11A:
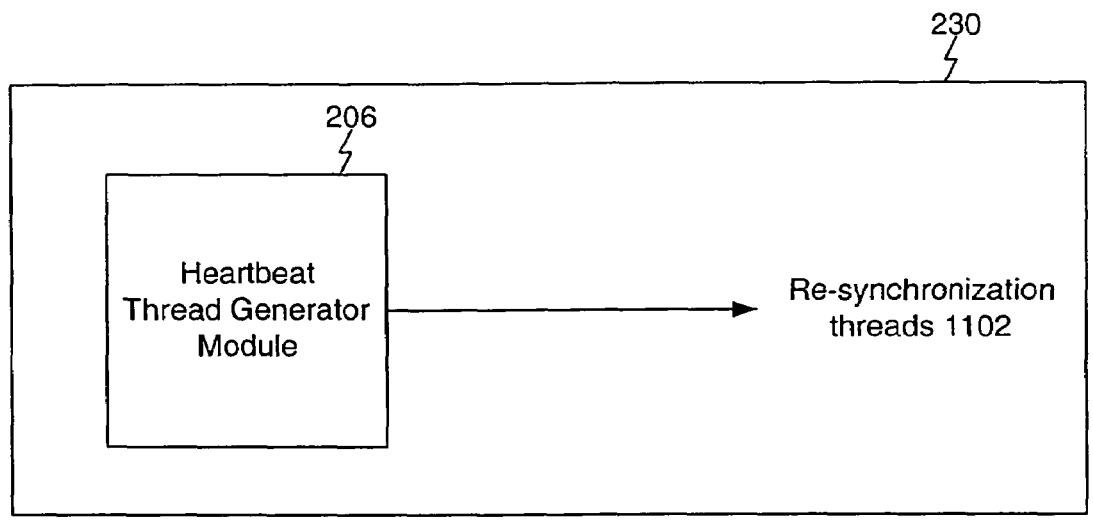
FIG. 11A illustrates an embodiment of a network failure monitor, according to an embodiment of the present invention.
Figure 11B:
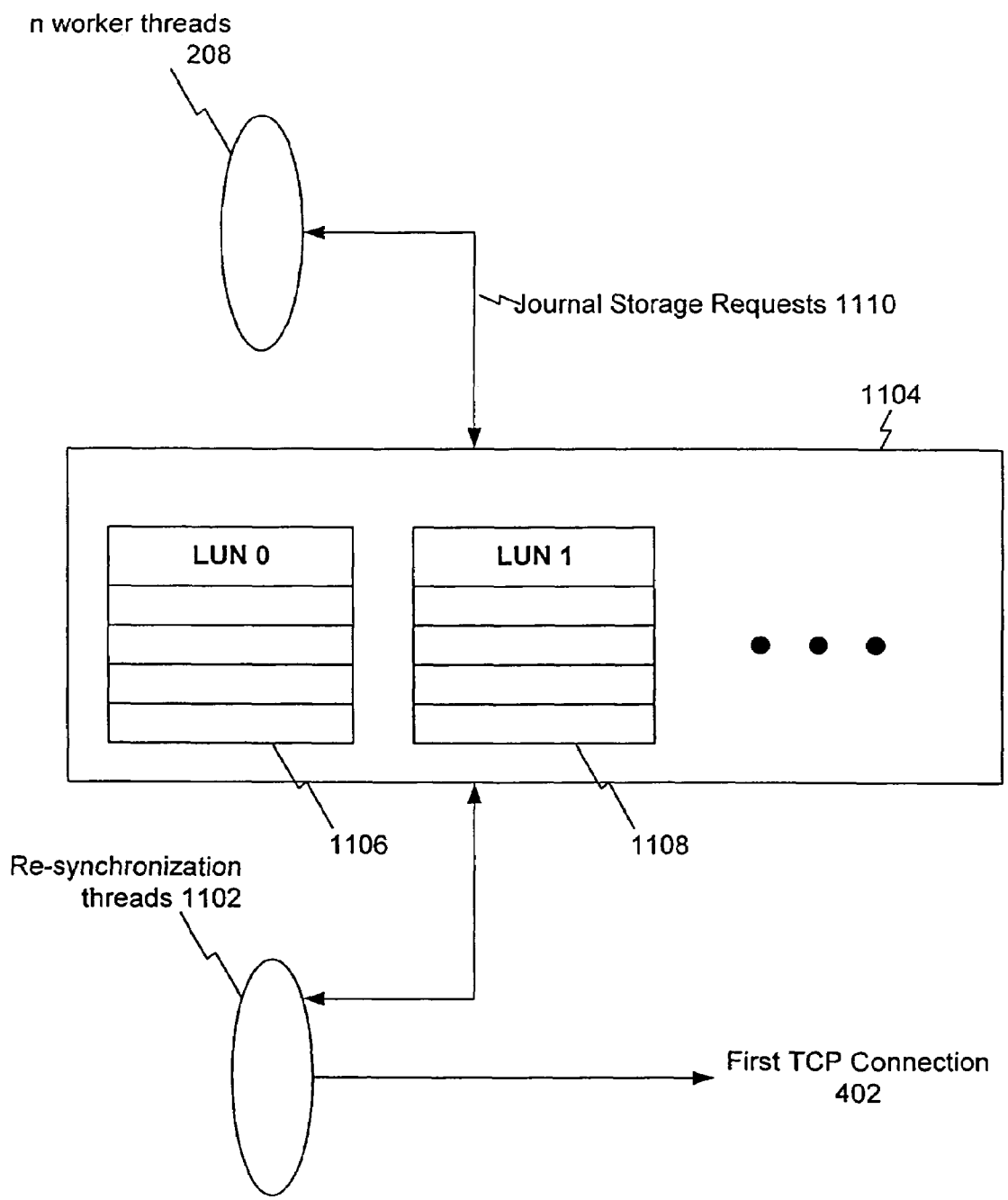
FIG. 11B illustrates a mirror storage re-synchronization implementation, according to an embodiment of the present invention.

During such an interruption, mirror storage requests received by local storage server 106 must be "journaled" or queued, to be later replayed when the interruption is over. FIG. 11B illustrates a mirror storage re-synchronization implementation, according to an embodiment of the present invention.

As shown in FIG. 11B, during an interruption, n worker threads 208 send mirror storage requests into a mirror storage request journal 1104 as journal storage requests 1110. Mirror storage request journal 1104 maintains a record of all mirror storage requests that occur during an interruption. In an embodiment, journal storage requests 1110 are maintained in separate journals on a LUN-by-LUN basis, as shown in FIG. 11B. For example, mirror storage requests relating to LUN 0 are maintained in first LUN journal 1106. Mirror storage requests relating to LUN 1 are maintained in second LUN journal 1108. Any number of subsequent journals may exist for subsequent LUNs. Journal storage requests 1110 may be maintained and organized in other fashions, such as on a worker thread-by-worker thread basis, etc.

After the interruption is over, journal mirror storage requests must be replayed. FIG. 11A illustrates an embodiment of network failure monitor 230, according to an embodiment of the present invention. Heartbeat thread generator module 206 in network failure monitor 230 may generate re-synchronization threads 1102. Re-synchronization threads 1102 are used to re-play the mirror storage requests stored in the journals of mirror storage request journal 1104. As shown in FIG. 11B, re-synchronization threads 1102 read the journals of mirror storage request journal 1104, and send the journaled storage requests to mirror storage server 108 across first TCP connections 402. Any number of re-synchronization threads may be generated, as is required by the particular application. Re-synchronization threads in mirror storage server 108 replay journaled mirror storage requests in a similar fashion.

Description of the network failure detector/health monitor of the present invention in these terms is provided for convenience only. It is not intended that the invention be limited to application in this example environment. In fact, after reading the description herein, it will become apparent to a person skilled in the relevant art how to implement the invention in alternative environments known now or developed in the future.

Operational Embodiments of the Present Invention

Figure 12A:
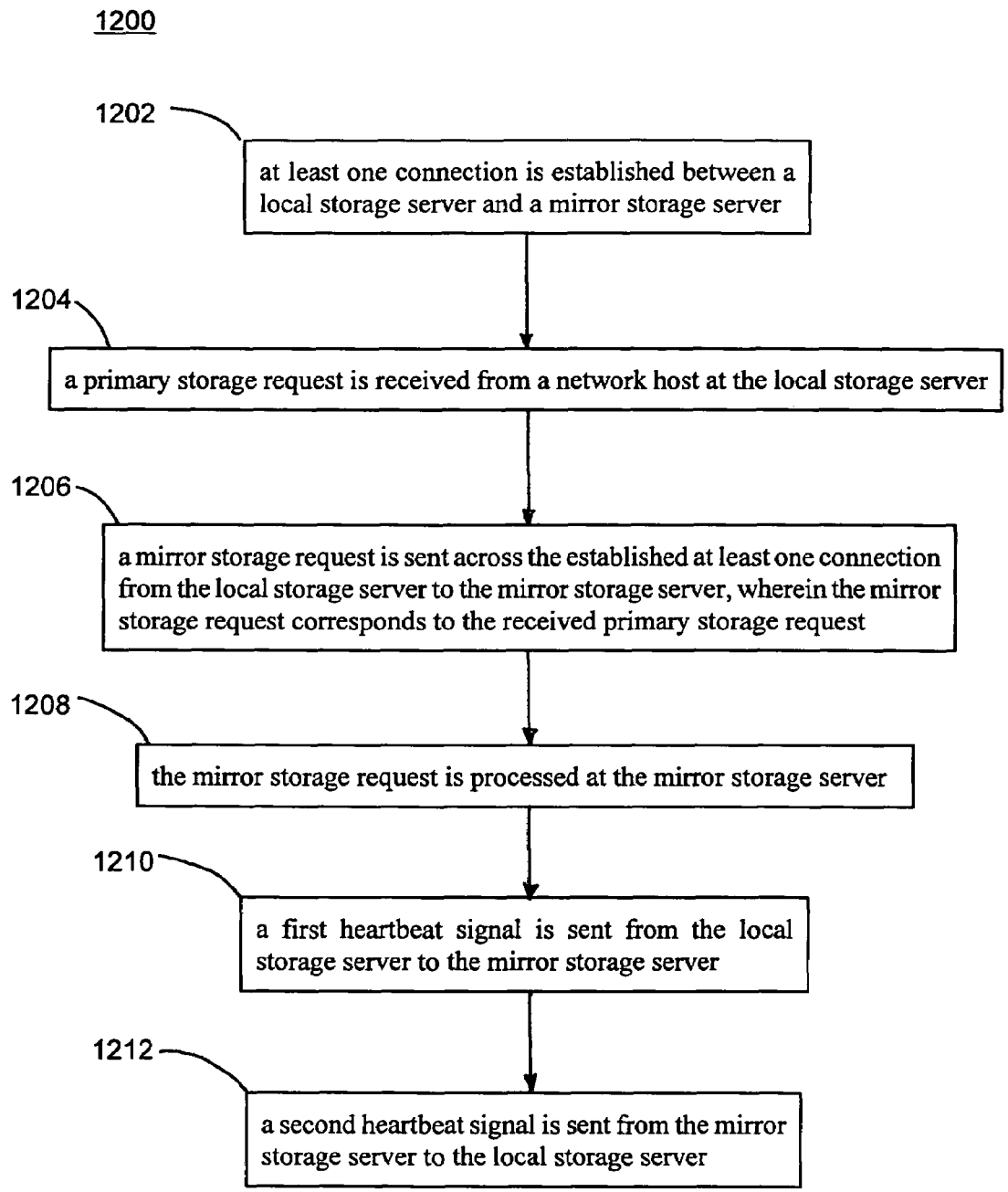
FIGS. 12A to 12J show flowcharts providing operational steps of exemplary embodiments of the present invention.

FIG. 12A shows a flowchart 1200 providing operational steps of an example embodiment of the present invention. FIGS. 12B-J show operational steps of further embodiments of the present invention. The steps of FIGS. 12A-J may be implemented in hardware, firmware, software, or a combination thereof. For instance, the steps of FIGS. 12A-J may be implemented by local storage server 106 and mirror storage server 108. Furthermore, the steps of FIGS. 12A-J do not necessarily have to occur in the order shown, as will be apparent to persons skilled in the relevant art(s) based on the teachings herein. Other structural embodiments will be apparent to persons skilled in the relevant art(s) based on the discussion contained herein. These steps are described in detail below.

The process begins with step 1202. In step 1202, at least one connection is established between a local storage server and a mirror storage server. In an embodiment, the one or more connections between the local storage server and the mirror storage server are TCP connections. Other connection protocols are also within the scope and spirit of the invention. For example, in an embodiment, the one or more connections are included in first TCP connections 402, from local storage server 106 to mirror connection threads 210b in mirror storage server 108.

In step 1204, a primary storage request is received from a network host at the local storage server. For example, in an embodiment, the primary storage request is received from local servers 102 by local worker thread m 602 as storage request 608.

In step 1206, a mirror storage request is sent across the established at least one connection from the local storage server to the mirror storage server, wherein the mirror storage request corresponds to the received primary storage request. For example, in an embodiment, the mirror storage request is sent by local worker thread m 602 on first TCP connection m 612 from local storage server 106.

For example, in an embodiment, the mirror storage request is received by mirror connection thread m 704 in mirror storage server 108.

In step 1208, the mirror storage request is processed at the mirror storage server. For example, in an embodiment, mirror connection thread m 704 undertakes the processing of the mirror storage request.

In step 1210, a first heartbeat signal is sent from the local storage server to the mirror storage server. For example, the first heartbeat signal is first heartbeat signal 406.

In step 1212, a second heartbeat signal is sent from the mirror storage server to the local storage server. For example, the second heartbeat signal is second heartbeat signal 408.

In an embodiment, step 1208 comprises the step of storing data of the received mirror storage request in a mirror storage device corresponding to a primary storage device. For example, the data of the mirror request is stored in a storage device/LUN of secondary storage 112 for the purposes of mirroring the data stored in a storage device/LUN of primary storage 110. In an embodiment, flowchart 1200 comprises the further step of sending a response across the established at least one connection from the mirror storage server to the local storage server, wherein the response indicates whether the storing of data of the received mirror storage request step was successful.

Figure 12B:
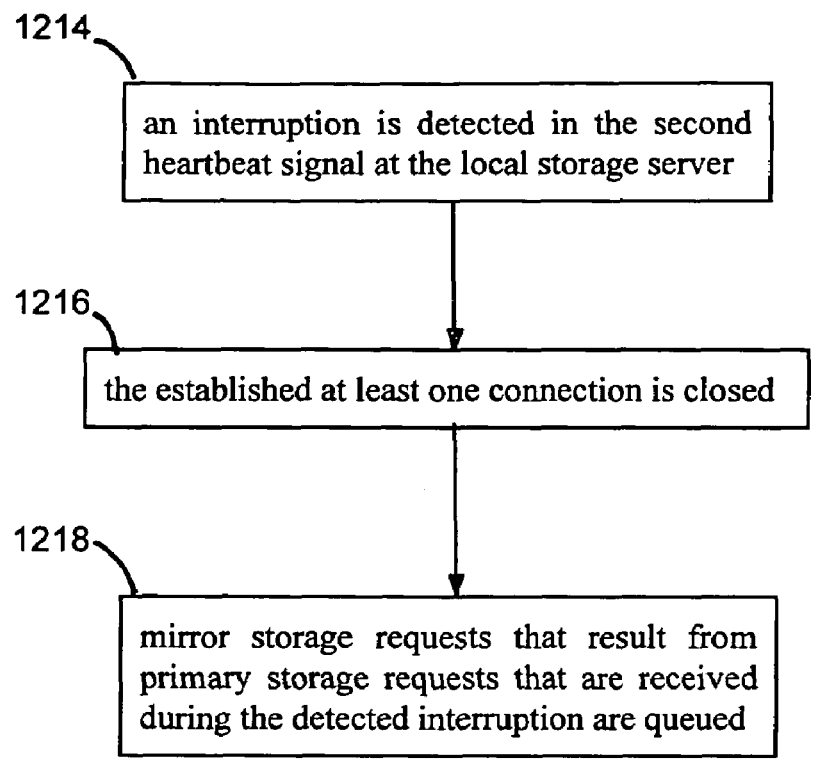

FIG. 12B provides additional exemplary steps for flowchart 1200 of FIG. 12A:

In step 1214, an interruption is detected in the second heartbeat signal at the local storage server.

In step 1216, the established at least one connection is closed. For example, in an embodiment, local storage server 106 and/or mirror storage server 108 closes first TCP connection m 612 when it detects an interruption in second heartbeat signal 408.

In step 1218, mirror storage requests that result from primary storage requests that are received during the detected interruption are queued. For example, in an embodiment, the mirror storage requests are sent as journal storage requests 1110 to mirror storage request journal 1104 for queuing. In an embodiment, journal storage requests 1110 are stored in mirror storage request journal 1104 on a per LUN basis, in LUN journals 1106, 1108, etc.

Figure 12C:
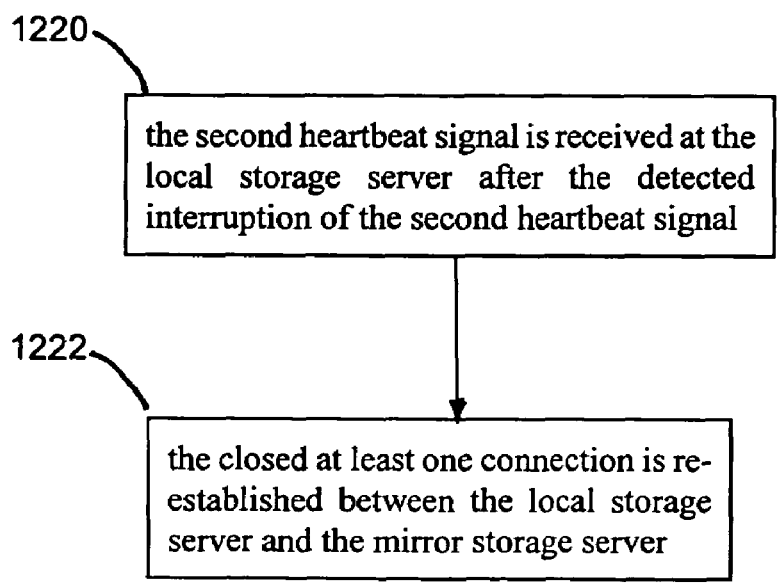

FIG. 12C provides additional exemplary steps for flowchart 1200 of FIG. 12A:

In step 1220, the second heartbeat signal is received at the local storage server after the detected interruption of the second heartbeat signal. The local storage server 106 may receive second heartbeat signal 408 once the network interruption goes away, or is repaired.

In step 1222, the closed at least one connection is re-established between the local storage server and the mirror storage server. For example, in an embodiment, first TCP connection m 612 is re-established between local storage server 106 and mirror server 108.

In an embodiment, the flowchart of FIG. 12C further comprises the step of sending the queued mirror storage requests across the re-established at least one connection after re-establishing step 1222. For example, in an embodiment, re-synchronization threads 1102 are generated by heartbeat thread generator module 206. The re-synchronization threads 1102 read the journaled mirror requests from mirror storage request journal 1104, and send them to mirror storage server 108 via first TCP connection 402.

In an embodiment, step 1214 comprises the step of detecting an interruption in the second heartbeat signal at the local storage server that has a duration longer than a first predetermined amount of time.

Figure 12D:
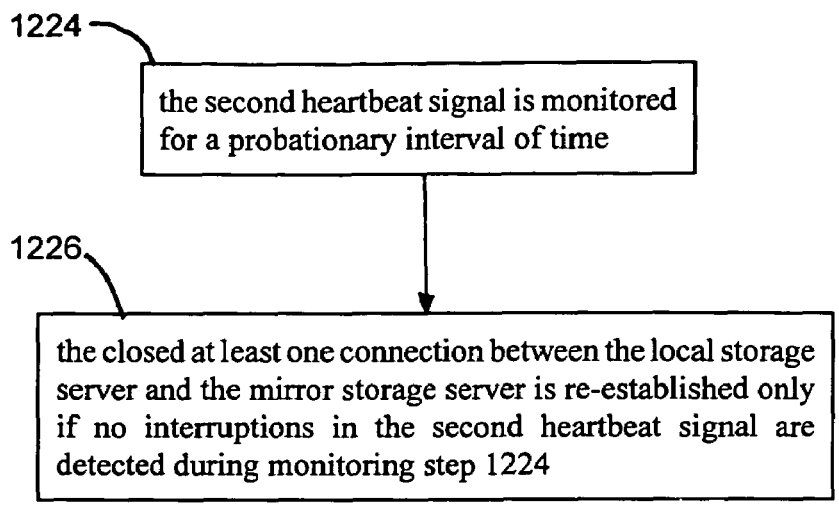

FIG. 12D provides exemplary steps for step 1222 of FIG. 12C. In an embodiment, step 1222 comprises the following steps:

In step 1224, the second heartbeat signal is monitored for a probationary interval of time. As described above, second heartbeat signal 408 may be monitored for a period of time to determine whether it is stable.

In step 1226, the closed at least one connection between the local storage server and the mirror storage server is re-established only if no interruptions in the second heartbeat signal are detected during monitoring step 1224. As described above, first TCP connection m 612 may be re-established once the network connection has stabilized between local storage server 106 and mirror storage server 108.

Figure 12E:
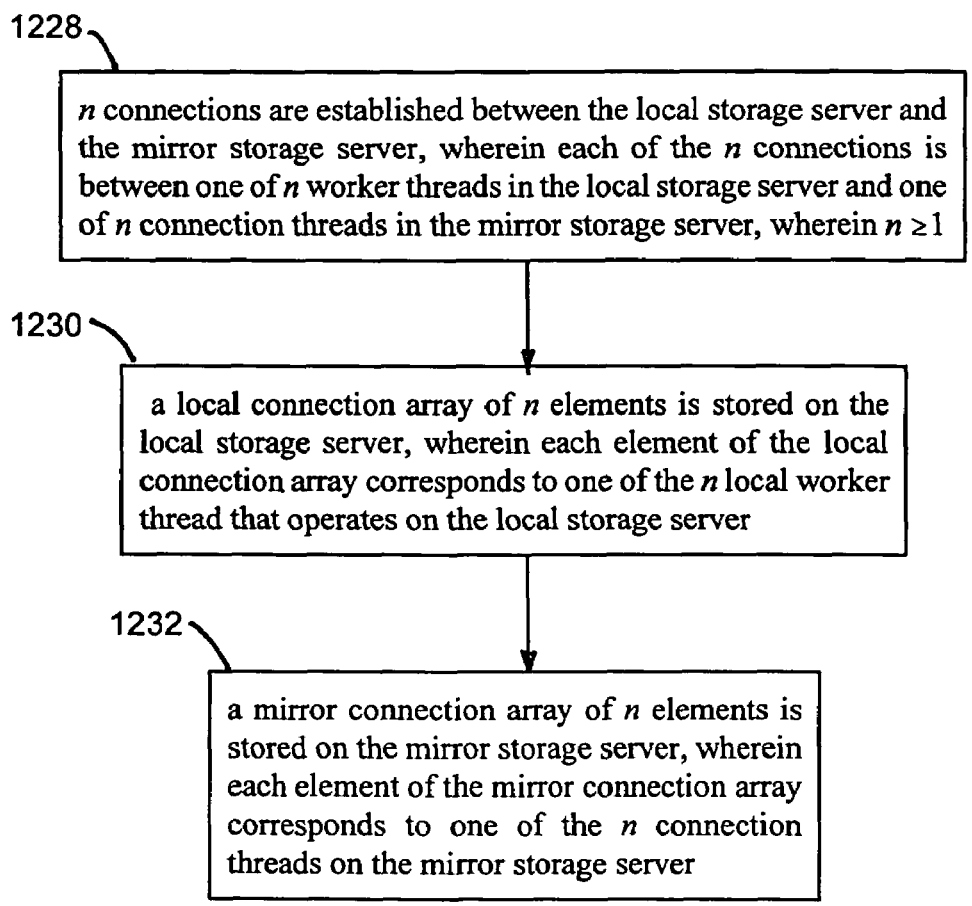

FIG. 12E provides exemplary steps for step 1202 of FIG. 12A. In an embodiment, step 1202 comprises the following steps:

In step 1228, n connections are established between the local storage server and the mirror storage server, wherein each of the n connections is between one of n worker threads in the local storage server and one of n connection threads in the mirror storage server, wherein $n \geq 1$. In an embodiment, the n established connections on the local storage server and the n established connections are TCP connections. For example, n first TCP connections 402 may be established between n worker threads 208a and connection threads 210b.

In step 1230, a local connection array of n elements is stored on the local storage server, wherein each element of the local connection array corresponds to one of the n local worker thread that operates on the local storage server. For example, in an embodiment, the local connection array of n elements is connection array 216a stored in local storage server 106. Each element of connection array 216a corresponds to one of the n local worker threads 208a.

In step 1232, a mirror connection array of n elements is stored on the mirror storage server, wherein each element of the mirror connection array corresponds to one of the n connection threads on the mirror storage server. For example, in an embodiment, the mirror connection array of n elements is connection array 216b stored in mirror storage server 108. Each element of connection array 216b corresponds to one of the n mirror worker threads 208b.

In an embodiment, step 1230 comprises the step of storing a local connection array of n elements, wherein each element comprises a socket and a timestamp. For example, in an embodiment, each element of elements 410a comprises the socket parameter and timestamp parameter. In an embodiment, step 1202 comprises the step of establishing each of the n connections according to the socket parameter stored in the corresponding one of the n elements of the stored local connection array. For example, in an embodiment, the n connections are each established according to the socket parameter in a corresponding one of the n elements 410a of connection array 216a.

In an embodiment, step 1232 comprises the step of storing a mirror connection array of n elements, wherein each element comprises a socket parameter and a timestamp parameter. For example, in an embodiment, each element of elements 410*b* comprises the socket parameter and timestamp parameter.

Figure 12F:
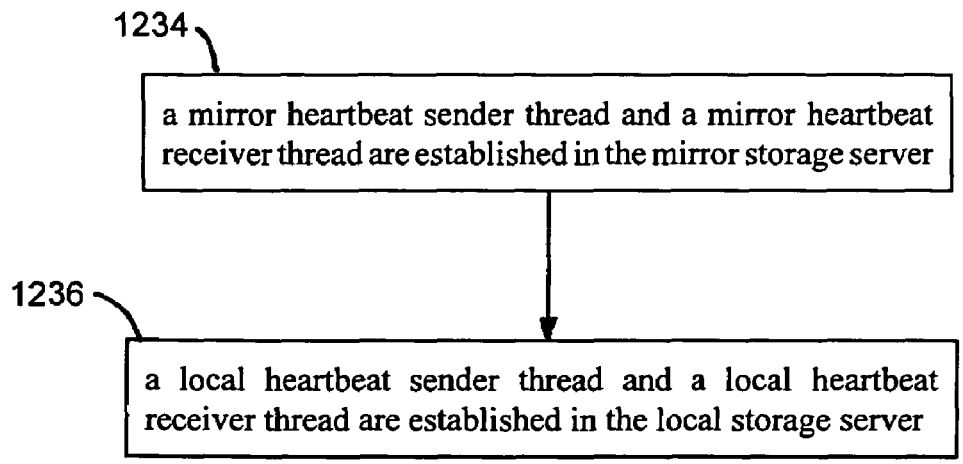

FIG. 12F provides additional exemplary steps for flowchart 1200 of FIG. 12A:

In step 1234, a mirror heartbeat sender thread and a mirror heartbeat receiver thread are established in the mirror storage server. For example, the mirror heartbeat sender thread and mirror heartbeat receiver thread are heartbeat sender thread 212*b* and heartbeat receiver thread 214*b*, respectively.

In step 1236, a local heartbeat sender thread and a local heartbeat receiver thread are established in the local storage server. For example, the local heartbeat sender thread and local heartbeat receiver thread are local heartbeat sender thread 212*a* and local heartbeat receiver thread 214*a*, respectively. In a further embodiment, step 1218 further comprises the step of sending the first heartbeat signal from the local heartbeat sender thread to the mirror heartbeat receiver thread. In a further embodiment, step 1220 further comprises the step of sending the second heartbeat signal from the mirror heartbeat sender thread to the local heartbeat receiver thread on the local storage server.

In an embodiment, step 1234 and step 1236 each comprise the step of sending a message at time intervals of a second predetermined amount of time. In an embodiment, step 1234 and step 1236 each comprises the step of sending a user datagram protocol (UDP) message at time intervals of the second predetermined amount of time. For example, in an embodiment, the second predetermined amount of time is 1.5 seconds. In alternative embodiments, the second predetermined time amount may be any number.

In an embodiment, step 1210 comprises the step of updating the timestamp parameter of each of the n elements of the mirror connection array whenever the message on the first heartbeat signal is received by the mirror heartbeat receiver thread. For example, in an embodiment, each element of connection array 216*b* is updated when the UDP message is received on first heartbeat signal 406.

In an embodiment, step 1212 comprises the step of updating the timestamp parameter of each of the n elements of the local connection array whenever the message on the second heartbeat signal is received by the local heartbeat receiver thread. For example, in an embodiment, each element of connection array 216*a* is updated when the UDP message is received on second heartbeat signal 408.

In an embodiment, step 1214 comprises the step of indicating in one of the n elements of the mirror connection array that the corresponding one of the established n connections is closed if the timestamp parameter of the one of the n elements is older than the first predetermined amount of time. For example, in an embodiment, one of the n established connections of second TCP connections 404 closed on mirror storage server 108 if the corresponding timestamp is older than 4.0 seconds. In alternative embodiments, the first predetermined amount of time may be any number. One of the n established connections on the mirror storage server may be closed by placing a closed entry into the timestamp or into a status parameter of the corresponding element, for example.

Figure 12G:
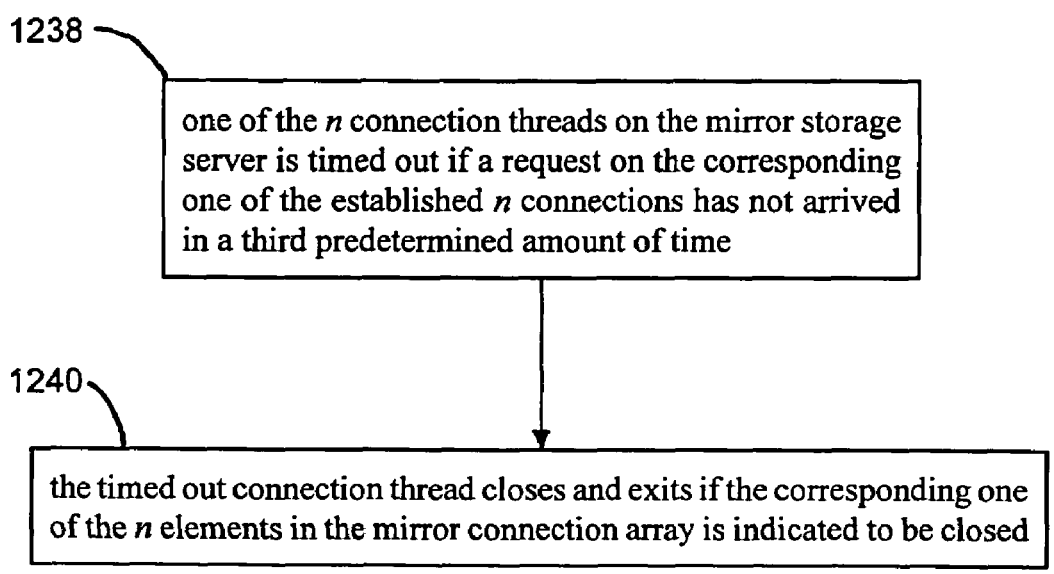

FIG. 12G provides exemplary steps for step 1216 of FIG. 12B. In an embodiment, step 1216 comprises the following steps:

In step 1238, one of the n connection threads on the mirror storage server is timed out if a request on the corresponding one of the established n connections has not arrived in a third predetermined amount of time. For example, in an embodiment, the mirror connection thread m 704 times out if a mirror storage request is not received on first TCP connection m 612.

In step 1240, the timed out connection thread closes and exits if the corresponding one of the n elements in the mirror connection array is indicated to be closed. For example, mirror connection thread m 704 closes and exits if element m 706 is indicated to be closed.

Figure 12H:
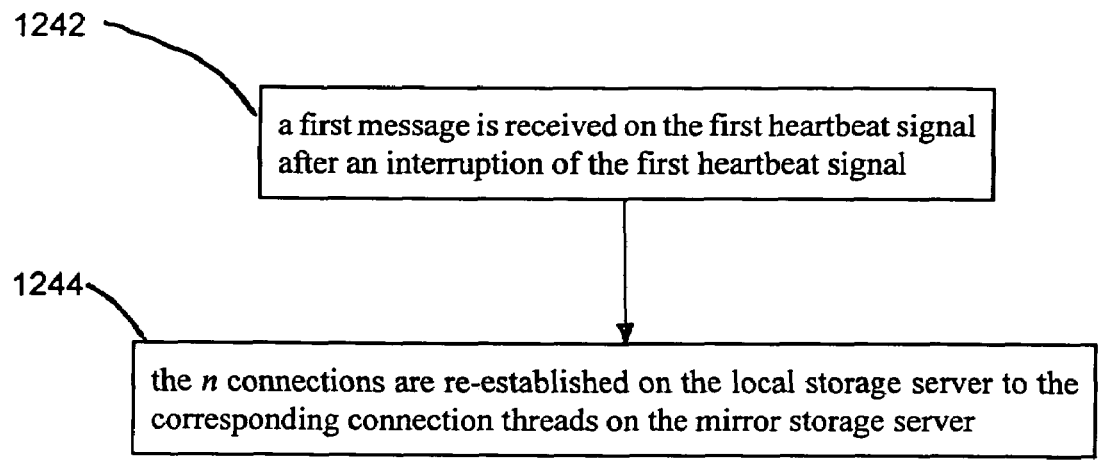

FIG. 12H provides additional exemplary steps for flowchart 1200 of FIG. 12A:

In step 1242, a first message is received on the first heartbeat signal after an interruption of the first heartbeat signal. For example, a message is received on first heartbeat signal 406 after a period of interruption due to local storage server 106 going down, a break in the network, or other type of server or network interruption. Once the first message is received, a timer may be started corresponding to a probationary interval. If an interruption in messages received on the first heartbeat signal occurs during the probationary interval, step 1242 may be repeated.

In step 1244, the n connections are re-established on the local storage server to the corresponding connection threads on the mirror storage server.

In an embodiment, step 1220 comprises the step of receiving a first message on the second heartbeat signal after an interruption of the second heartbeat signal. For example, a message may be received on second heartbeat signal 408 after a period of interruption due to mirror storage server 108 going down, a break in the network, or other type of server or network interruption.

Figure 12I:
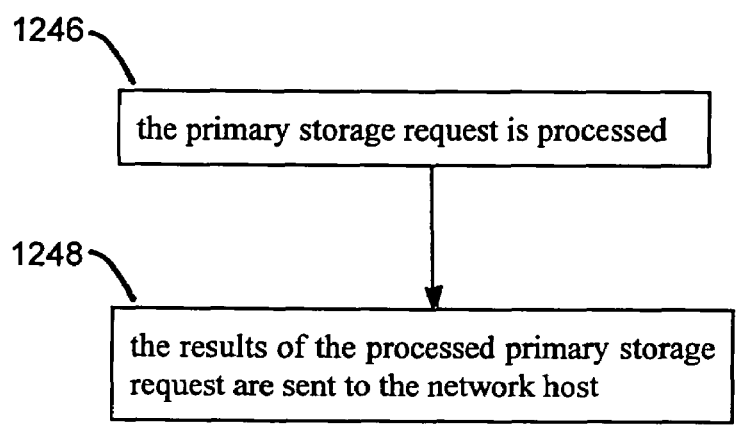

FIG. 12I provides additional exemplary steps for flowchart 1200 of FIG. 12A, wherein the local storage server operates in an asynchronous mirror mode. For example, in an embodiment, local storage server 106 may operate in an asynchronous mirror mode, where local storage server 106 sends responses regarding attempt to store data in primary storage to hosts before receiving mirror storage responses from mirror storage server 108.

In step 1246, the primary storage request is processed. For example, data associated with the primary storage request is stored in primary storage 110.

In step 1248, the results of the processed primary storage request are sent to the network host. For example, an indication of whether the data was stored in primary storage 110 successfully is sent to the host in local servers 102.

Figure 12J:
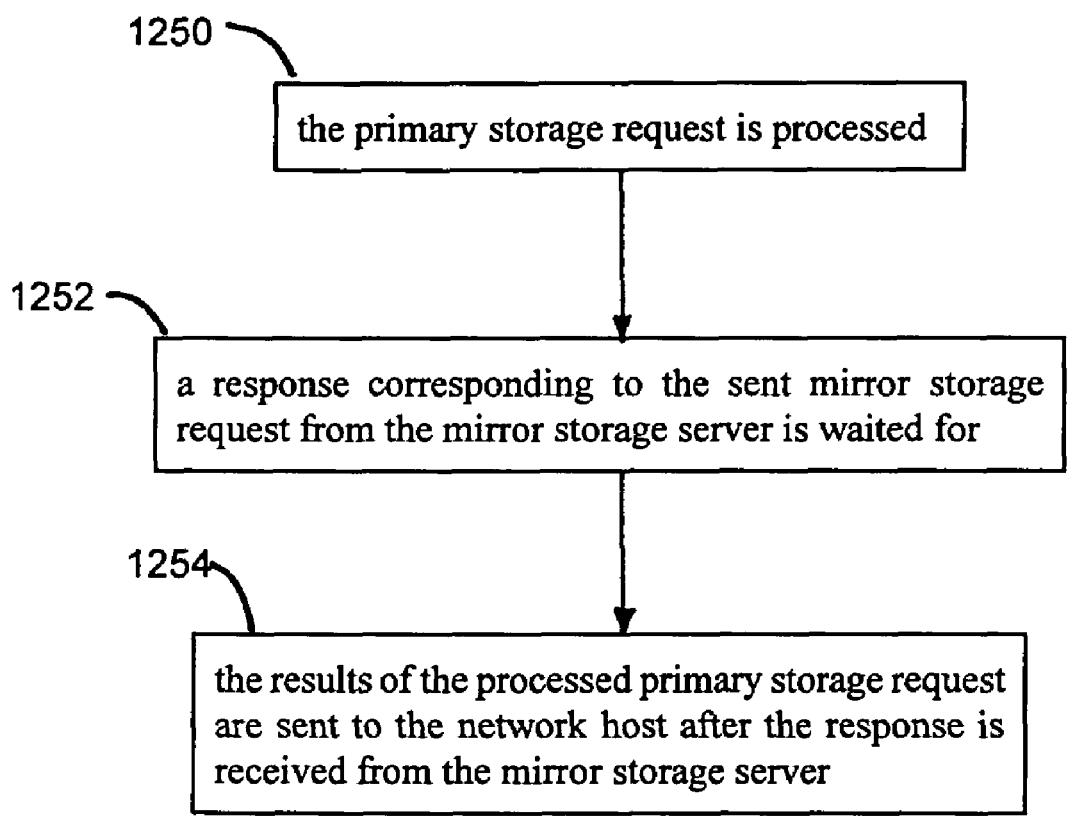

FIG. 12J provides additional exemplary steps for flowchart 1200 of FIG. 12A, wherein the local storage server is operating in a synchronous mirror mode. For example, in an embodiment, local storage server 106 may operate in a synchronous mirror mode, where local storage server 106 waits for a response from mirror storage server 108 before sending a primary storage attempt response to the host.

In step 1250, the primary storage request is processed. For example, data associated with the storage request is stored in primary storage 110.

In step 1252, a response corresponding to the sent mirror storage request from the mirror storage server is waited for. For example, local storage server 106 waits for an indication from mirror storage server 108 whether the mirror storage request was successful.

In step 1254, the results of the processed primary storage request are sent to the network host after the response is received from the mirror storage server. For example, an indication of whether the data was stored in primary storage 110 successfully is sent to the host in local servers 102. An indication of whether the mirror storage request was successful may also be sent to the host.

In an embodiment, the process of flowchart 1200 of FIG. 12A comprises the further step of determining whether a LUN related to the received primary storage request is designated to be mirrored. For example, some LUNs in primary storage 110 may be mirrored in secondary storage 112, while other LUNs in primary storage may not be mirrored. Hence, this step determines whether a mirror storage request may be appropriate for a particular LUN.

Figure 13A:
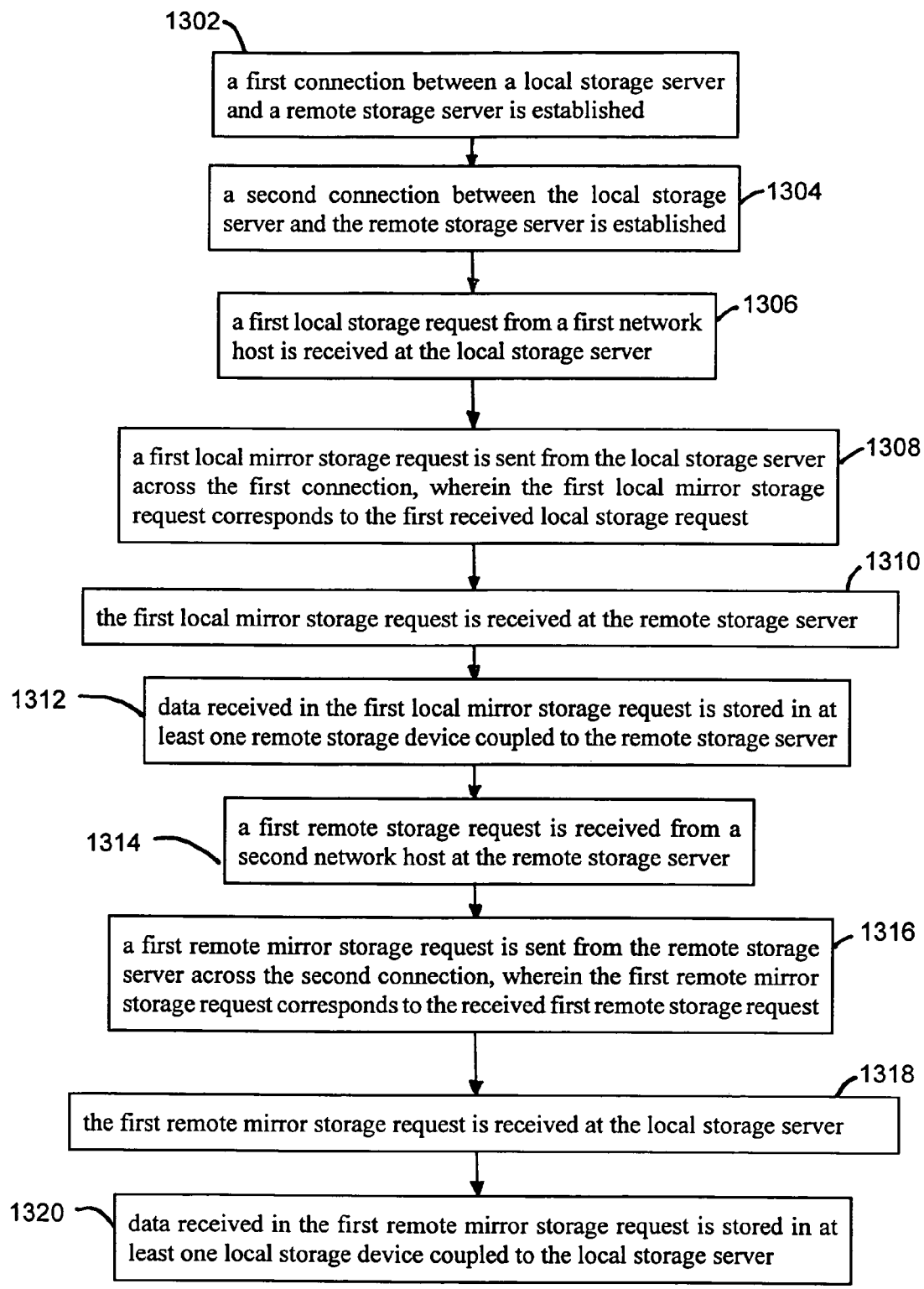
FIGS. 13A to 13F show flowcharts providing operational steps of exemplary bi-directional mirroring embodiments of the present invention.

FIG. 13A shows a flowchart 1300 providing operational steps of an example bi-directional mirroring embodiment of the present invention. FIGS. 13B-J show operational steps of further embodiments of the present invention. The steps of FIGS. 13A-J may be implemented in hardware, firmware, software, or a combination thereof. For instance, the steps of FIGS. 13A-J may be implemented by local storage server 106 and mirror storage server 108. Furthermore, the steps of FIGS. 13A-J do not necessarily have to occur in the order shown, as will be apparent to persons skilled in the relevant art(s) based on the teachings herein. Other structural embodiments will be apparent to persons skilled in the relevant art(s) based on the discussion contained herein. These steps are described in detail below.

The process begins with step 1302. In step 1302, a first connection between a local storage server and a remote storage server is established. For example, in an embodiment, the first connection is included in n first TCP connections 402, between local storage server 106 and mirror storage server 108.

In step 1304, a second connection between the local storage server and the remote storage server is established. For example, in an embodiment, the second connection is included in n second TCP connections 404, between local storage server 106 and mirror storage server 108.

In step 1306, a first local storage request from a first network host is received at the local storage server. For example, in an embodiment, the first local storage request is received from local servers 102 as storage request 608.

In step 1308, a first local mirror storage request is sent from the local storage server across the first connection, wherein the first local mirror storage request corresponds to the first received local storage request. For example, in an embodiment, the first local mirror storage request is sent by local worker thread m 602 on first TCP connection m 612 from local storage server 106.

In step 1310, the first local mirror storage request is received at the remote storage server. For example, in an embodiment, the first local mirror storage request is received by mirror connection thread m 704 in mirror storage server 108.

In step 1312, data received in the first local mirror storage request is stored in at least one remote storage device coupled to the remote storage server. For example, the data of the first local mirror storage request is stored in a storage device/LUN of secondary storage 112.

In step 1314, a first remote storage request is received from a second network host at the remote storage server. For example, in an embodiment, the first remote storage request is received from mirror servers 104.

In step 1316, a first remote mirror storage request is sent from the remote storage server across the second connection, wherein the first remote mirror storage request corresponds to the received first remote storage request. For example, in an embodiment, the first remote mirror storage request is sent by a remote worker thread on a second TCP connection from mirror storage server 108.

In step 1318, the first remote mirror storage request is received at the local storage server. For example, in an embodiment, the first remote mirror storage request is received by a local connection thread in local storage server 106.

In step 1320, data received in the first remote mirror storage request is stored in at least one local storage device coupled to the local storage server. For example, the data of the first remote mirror storage request is stored in a storage device/LUN of primary storage 110.

Figure 13B:
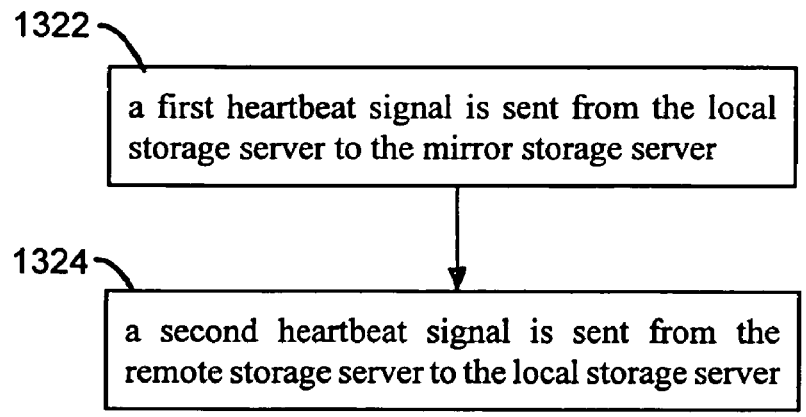

FIG. 13B provides additional exemplary steps for flowchart 1300 of FIG. 13A:

In step 1322, a first heartbeat signal is sent from the local storage server to the mirror storage server. For example, the first heartbeat signal is first heartbeat signal 406.

In step 1324, a second heartbeat signal is sent from the remote storage server to the local storage server. For example, the second heartbeat signal is second heartbeat signal 408.

Figure 13C:
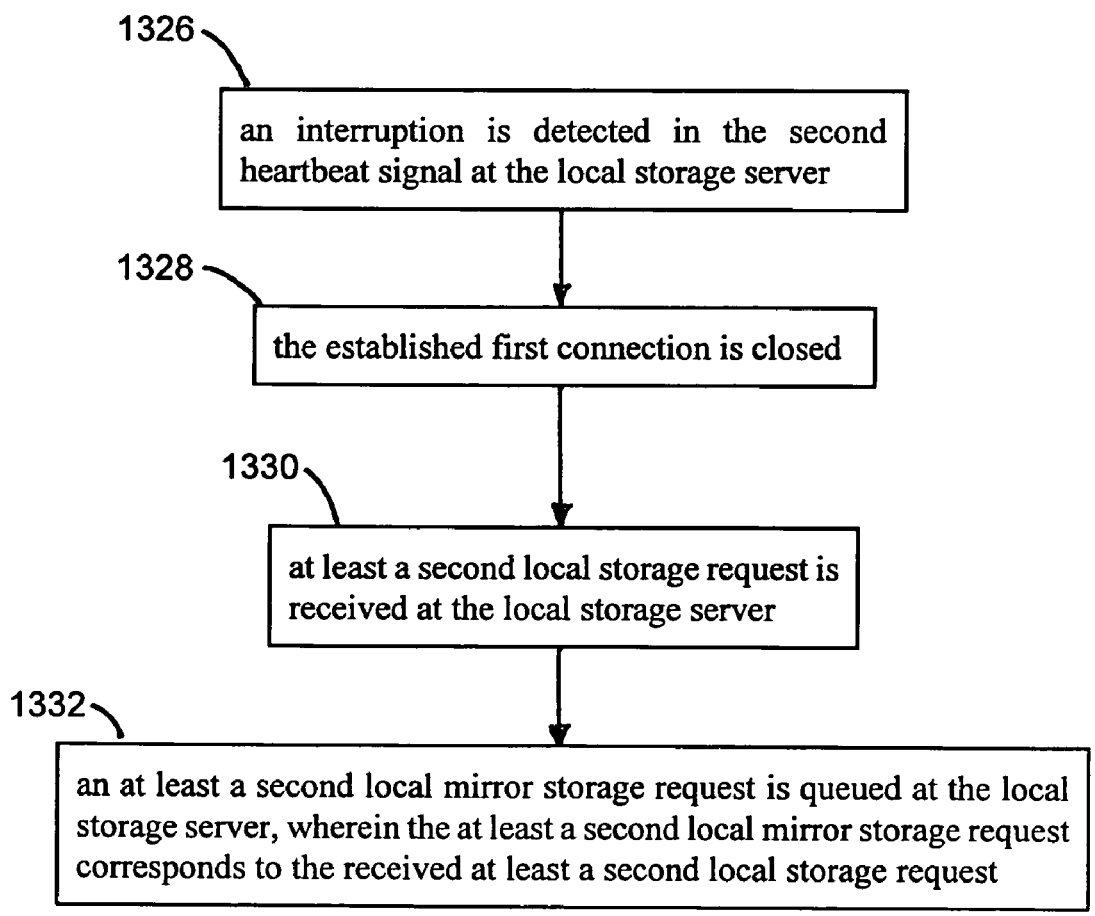

FIG. 13C provides additional exemplary steps for flowchart 1300 of FIG. 13A:

In step 1326, an interruption is detected in the second heartbeat signal at the local storage server.

In step 1328, the established first connection is closed. For example, in an embodiment, local storage server 106 and/or mirror storage server 108 closes first TCP connection m 612 when it detects an interruption in second heartbeat signal 408.

In step 1330, at least a second local storage request is received at the local storage server. For example, local servers 102 continues to send storage requests to local storage server 106

In step 1332, an at least a second local mirror storage request is queued at the local storage server, wherein the at least a second local mirror storage request corresponds to the received at least a second local storage request. For example, in an embodiment, the subsequent local mirror storage requests are sent as journal storage requests 1110 to mirror storage request journal 1104 in local storage server 106 for queuing. In an embodiment, journal storage requests 1110 are stored in mirror storage request journal 1104 on a per LUN basis, in LUN journals 1106, 1108, etc.

Figure 13D:
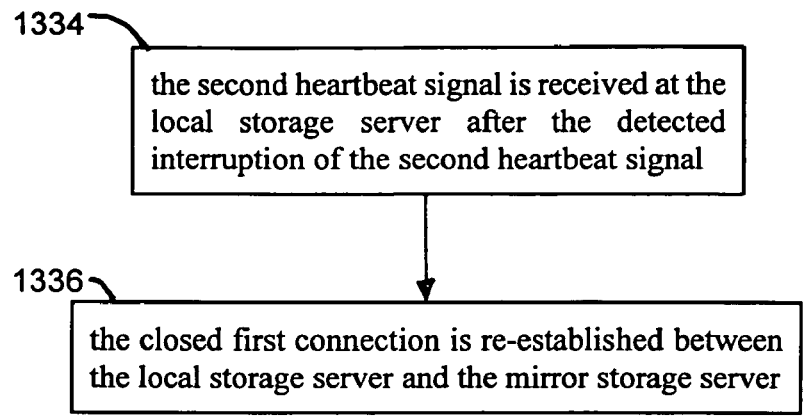

FIG. 13D provides additional exemplary steps for flowchart 1300 of FIG. 13A:

In step 1334, the second heartbeat signal is received at the local storage server after the detected interruption of the second heartbeat signal. Local storage server 106 may receive second heartbeat signal 408 once the network interruption goes away, or is repaired, for example.

In step 1336, the closed first connection is re-established between the local storage server and the mirror storage server.

In an embodiment, flowchart 1330 includes the further step of sending the queued at least a second local mirror storage requests across the re-established first connection after re-establishing step 1336. For example, in an embodiment, re-synchronization threads 1102 are generated by heartbeat thread generator module 206 in local storage server 106. The re-synchronization threads 1102 read the journaled mirror requests from mirror storage request journal 1104, and send them to mirror storage server 108 via n first TCP connections 402.

Figure 13E:
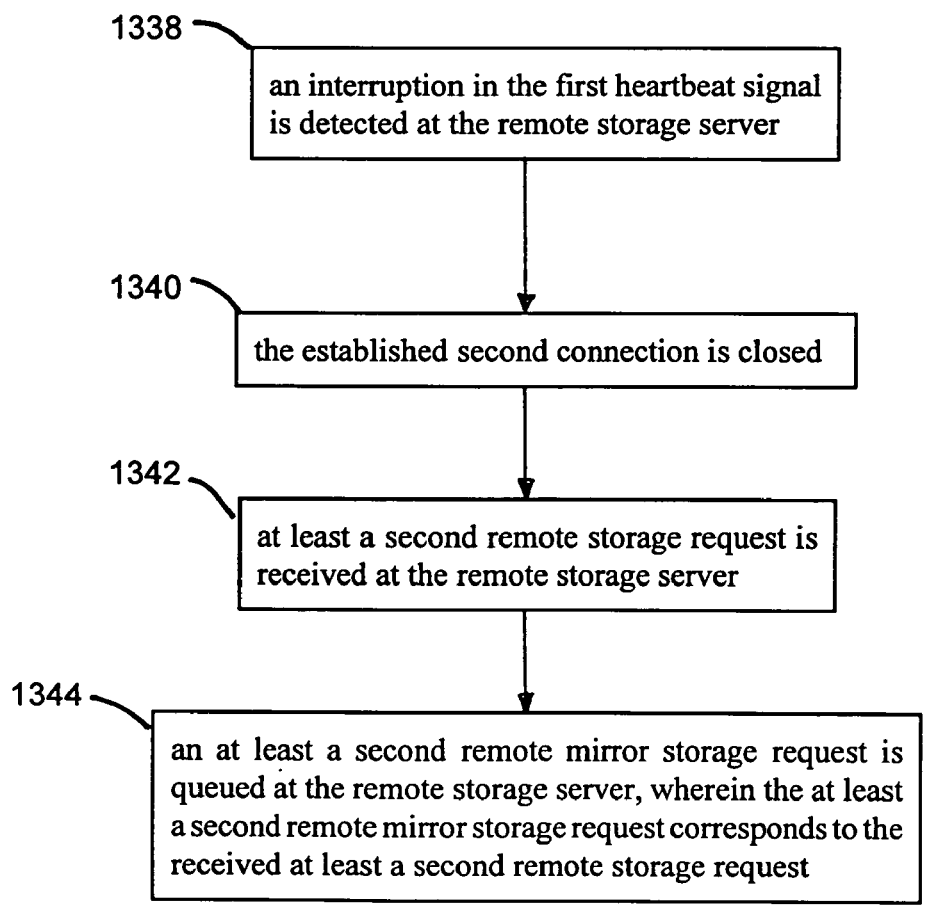

FIG. 13E provides additional exemplary steps for flowchart 1300 of FIG. 13A:

In step 1338, an interruption in the first heartbeat signal is detected at the remote storage server.

In step 1340, the established second connection is closed. For example, in an embodiment, local storage server 106 and/or mirror storage server 108 closes the second TCP connection when it detects an interruption in first heartbeat signal 406.

In step 1342, at least a second remote storage request is received at the remote storage server. For example, mirror servers 104 continues to send storage requests to mirror storage server 108

In step 1344, an at least a second remote mirror storage request is queued at the remote storage server, wherein the at least a second remote mirror storage request corresponds to the received at least a second remote storage request. For example, in an embodiment, the subsequent remote mirror storage requests are sent as journal storage requests 1110 to a mirror storage request journal 1104 in mirror storage server 108 for queuing. In an embodiment, journal storage requests 1110 are stored in mirror storage request journal 1104 on a per LUN basis, in LUN journals 1106, 1108, etc.

Figure 13F:
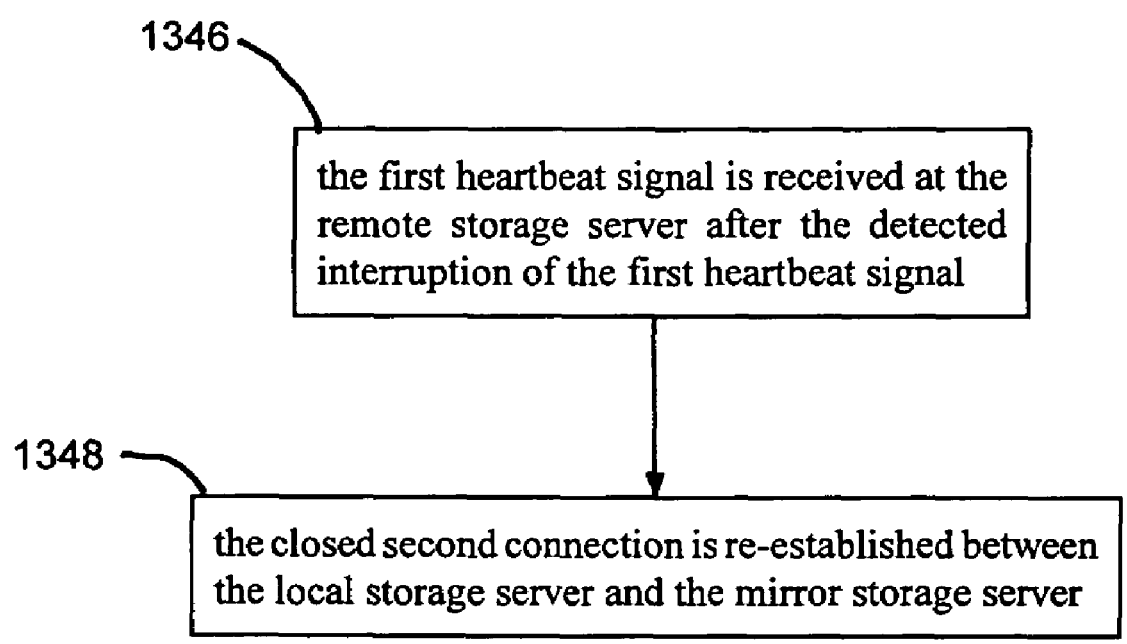

FIG. 13F provides additional exemplary steps for flowchart 1300 of FIG. 13A:

In step 1346, the first heartbeat signal is received at the remote storage server after the detected interruption of the first heartbeat signal. Mirror storage server 108 may receive first heartbeat signal 406 once the network interruption goes away, or is repaired.

In step 1348, the closed second connection is re-established between the local storage server and the mirror storage server.

In an embodiment, flowchart 1330 includes the further step of sending the queued at least a second remote mirror storage request across the re-established second connection after re-establishing step 1348. For example, in an embodiment, re-synchronization threads 1102 are generated by heartbeat thread generator module 206 in mirror storage server 108. The re-synchronization threads 1102 read the journaled mirror requests from mirror storage request journal 1104, and send them to local storage server 106 via n second TCP connections 404.

The steps shown and/or described above in regards to flowchart 1200 and FIGS. 12A-J are applicable to the bi-directional mirroring described in flowchart 1300, FIGS. 13A-F, and surrounding text.

For illustrative purposes, the operation of the invention is represented above by flowcharts, such as flowchart 1200 in FIG. 12A and flowchart 1300 in FIG. 13A. It should be understood, however, that the use of flowcharts is for illustrative purposes only, and is not limiting. For example, the invention is not limited to the operational embodiment(s) represented by the flowcharts. Instead, alternative operational embodiments will be apparent to persons skilled in the relevant art(s) based on the discussion contained herein. Also, the use of flowcharts should not be interpreted as limiting the invention to discrete or digital operation. In practice, as will be appreciated by persons skilled in the relevant art(s) based on the herein discussion, the invention can be achieved via discrete or continuous operation, or a combination thereof. Further, the flow of control represented by the flowcharts is provided for illustrative purposes only. Steps may occur in a different order than shown. Furthermore, as will be appreciated by persons skilled in the relevant art(s), other operational control flows are within the scope and spirit of the present invention.

Example Storage Area Network Environment

In a preferred embodiment, the present invention is applicable to storage area networks. As discussed above, a storage area network (SAN) is a high-speed sub-network of shared storage devices. A SAN operates to provide access to the shared storage devices for all servers on a local area network (LAN), wide area network (WAN), or other network coupled to the SAN.

It is noted that SAN attached storage (SAS) elements can connect directly to the SAN, and provide file, database, block, or other types of data access services. SAS elements that provide such file access services are commonly called Network Attached Storage, or NAS devices. NAS devices can be coupled to the SAN, either directly or through their own network configuration. A SAN configuration potentially provides an entire pool of available storage to each network server, eliminating the conventional dedicated connection between server and disk. Furthermore, because a server's mass data storage requirements are fulfilled by the SAN, the server's processing power is largely conserved for the handling of applications rather than the handling of data requests. For example, primary storage 110 and secondary storage 112 may be configured as SANs.

Figure 8:
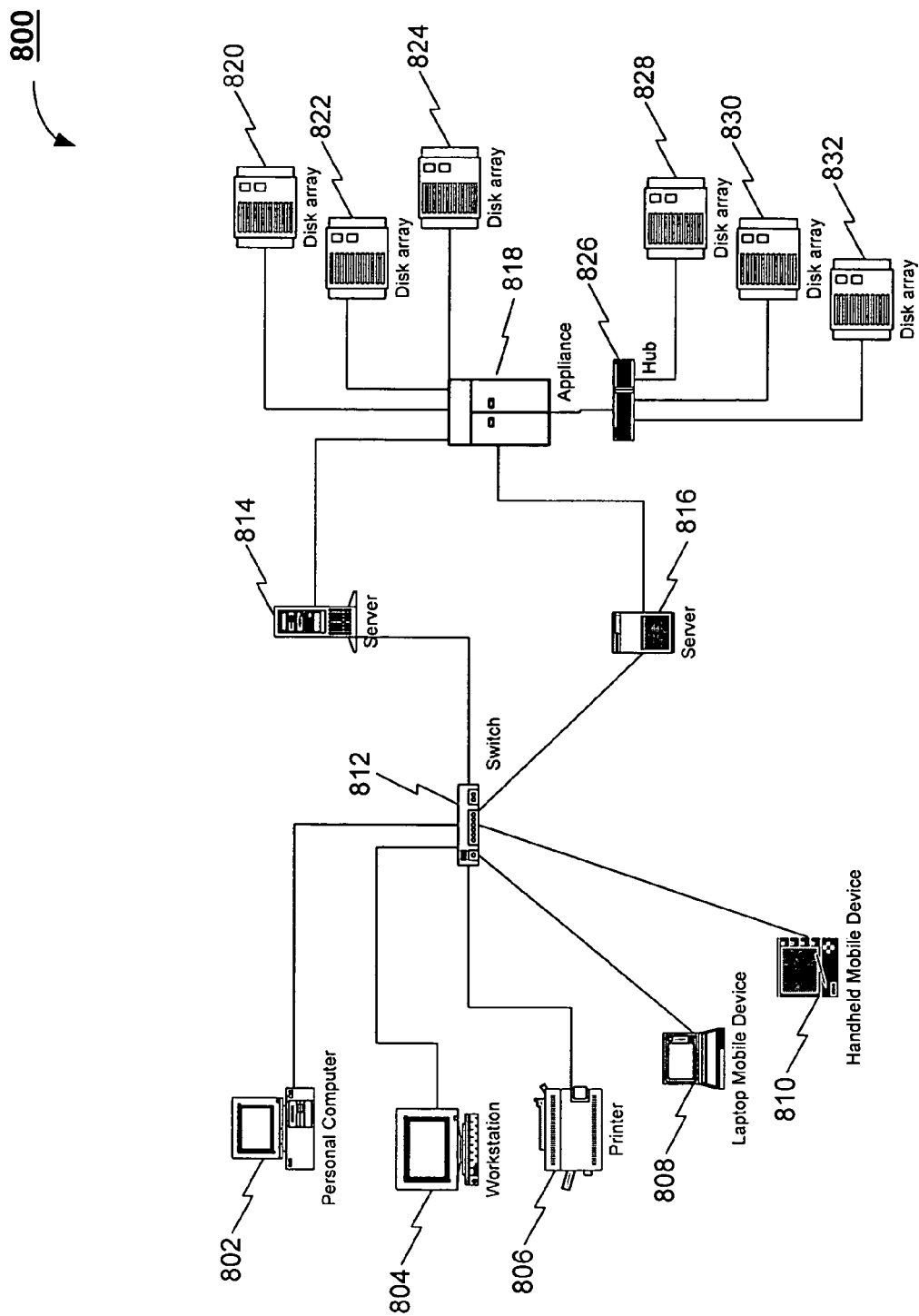
FIG. 8 illustrates an example data communication network, according to an embodiment of the present invention.

FIG. 8 illustrates an example data communication network 800, according to an embodiment of the present invention. Network 800 includes a variety of devices which support communication between many different entities, including businesses, universities, individuals, government, and financial institutions. As shown in FIG. 8, a communication network, or combination of networks, interconnects the elements of network 800. Network 800 supports many different types of communication links implemented in a variety of architectures.

Network 800 may be considered to be an example of a storage area network that is applicable to the present invention. Network 800 comprises a pool of storage devices, including disk arrays 820, 822, 824, 828, 830, and 832. Network 800 provides access to this pool of storage devices to hosts/servers comprised by or coupled to network 800. Network 800 may be configured as point-to-point, arbitrated loop, or fabric topologies, or combinations thereof.

Network 800 comprises a switch 812. Switches, such as switch 812, typically filter and forward packets between LAN segments. Switch 812 may be an Ethernet switch, fast-Ethernet switch, or another type of switching device known to persons skilled in the relevant art(s). In other examples, switch 812 may be replaced by a router or a hub. A router generally moves data from one local segment to another, and to the telecommunications carrier, such as AT & T or WorldCom, for remote sites. A hub is a common connection point for devices in a network. Suitable hubs include passive hubs, intelligent hubs, and switching hubs, and other hub types known to persons skilled in the relevant art(s).

Various types of terminal equipment and devices may interface with network 800. For example, a personal computer 802, a workstation 804, a printer 806, a laptop mobile device 808, and a handheld mobile device 810 interface with network 800 via switch 812. Further types of terminal equipment and devices that may interface with network 800 may include local area network (LAN) connections (e.g., other switches, routers, or hubs), personal computers with modems, content servers of multi-media, audio, video, and other information, pocket organizers, Personal Data Assistants (PDAs), cellular phones, Wireless Application Protocol (WAP) phones, and set-top boxes. These and additional types of terminal equipment and devices, and ways to interface them with network 800, will be known by persons skilled in the relevant art(s) from the teachings herein.

Network 800 includes one or more hosts or servers. For example, network 800 comprises server 814 and server 816. Servers 814 and 816 provide devices 802, 804, 806, 808, and 810 with network resources via switch 812. Servers 814 and 816 are typically computer systems that process end-user requests for data and/or applications. In one example configuration, servers 814 and 816 provide redundant services. In another example configuration, server 814 and server 816 provide different services and thus share the processing load needed to serve the requirements of devices 802, 804, 806, 808, and 810. In further example configurations, one or both of servers 814 and 816 are connected to the Internet, and thus server 814 and/or server 816 may provide Internet access to network 800. One or both of servers 814 and 816 may be Windows NT servers or UNIX servers, or other servers known to persons skilled in the relevant art(s).

A SAN appliance or device as described elsewhere herein may be inserted into network 800, according to embodiments of the present invention. For example, a SAN appliance 818 may to implemented to provide the required connectivity between the storage device networking (disk arrays 820, 822, 824, 828, 830, and 832) and hosts and servers 814 and 816, and to provide the additional functionality of the storage mirror of the present invention described elsewhere herein.

Network 800 includes a hub 826. Hub 826 is connected to disk arrays 828, 830, and 832. Preferably, hub 826 is a fibre channel hub or other device used to allow access to data stored on connected storage devices, such as disk arrays 828, 830, and 832. Further fibre channel hubs may be cascaded with hub 826 to allow for expansion of the SAN, with additional storage devices, servers, and other devices. In an example configuration for network 800, hub 826 is an arbitrated loop hub. In such an example, disk arrays 828, 830, and 832 are organized in a ring or loop topology, which is collapsed into a physical star configuration by hub 826. Hub 826 allows the loop to circumvent a disabled or disconnected device while maintaining operation.

Network 800 may include one or more switches in addition to switch 812 that interface with storage devices. For example, a fibre channel switch or other high-speed device may be used to allow servers 814 and 816 access to data stored on connected storage devices, such as disk arrays 820, 822, and 824, via appliance 818. Fibre channel switches may be cascaded to allow for the expansion of the SAN, with additional storage devices, servers, and other devices.

Disk arrays 820, 822, 824, 828, 830, and 832 are storage devices providing data and application resources to servers 814 and 816 through appliance 818 and hub 826. As shown in FIG. 8, the storage of network 800 is principally accessed by servers 814 and 816 through appliance 818. The storage devices may be fibre channel-ready devices, or SCSI (Small Computer Systems Interface) compatible devices, for example. Fibre channel-to-SCSI bridges may be used to allow SCSI devices to interface with fibre channel hubs and switches, and other fibre channel-ready devices. One or more of disk arrays 820, 822, 824, 828, 830, and 832 may instead be alternative types of storage devices, including tape systems, JBODs (Just a Bunch Of Disks), floppy disk drives, optical disk drives, and other related storage drive types.

The topology or architecture of network 800 will depend on the requirements of the particular application, and on the advantages offered by the chosen topology. One or more hubs 826, one or more switches, and/or one or more appliances 818 may be interconnected in any number of combinations to increase network capacity. Disk arrays 820, 822, 824, 828, 830, and 832, or fewer or more disk arrays as required, may be coupled to network 800 via these hubs 826, switches, and appliances 818.

Figure 9:
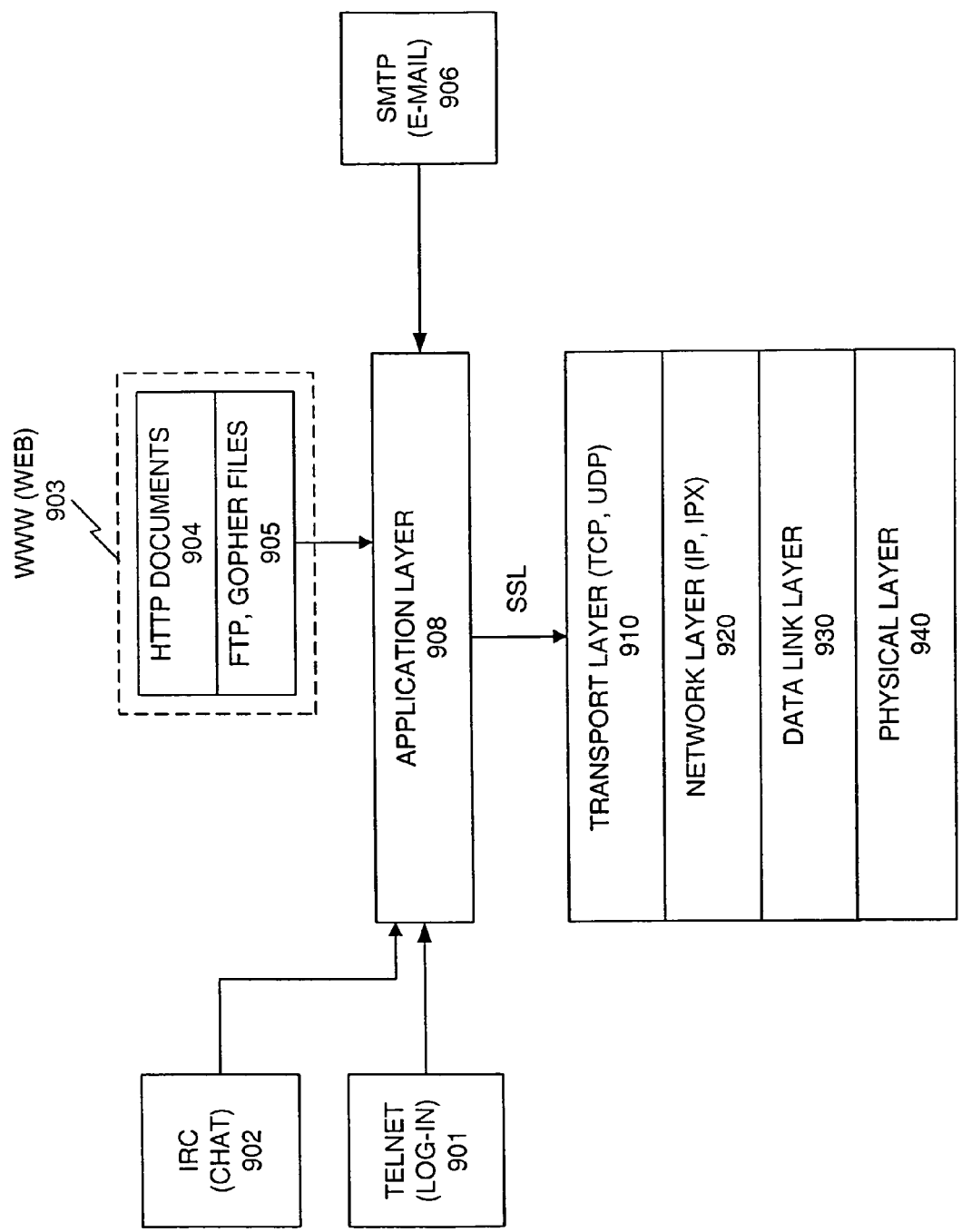
FIG. 9 shows a simplified five-layered communication model, based on an Open System Interconnection (OSI) reference model.

Communication over a communication network, such as shown in network 800 of FIG. 8, is carried out through different layers. FIG. 9 shows a simplified five-layered communication model, based on Open System Interconnection (OSI) reference model. As shown in FIG. 9, this model includes an application layer 908, a transport layer 910, a network layer 920, a data link layer 930, and a physical layer 940. As would be apparent to persons skilled in the relevant art(s), any number of different layers and network protocols may be used as required by a particular application.

Application layer 908 provides functionality for the different tools and information services which are used to access information over the communications network. Example tools used to access information over a network include, but are not limited to Telnet log-in service 901, IRC chat 902, Web service 903, and SMTP (Simple Mail Transfer Protocol) electronic mail service 906. Web service 903 allows access to HTTP documents 904, and FTP (File Transfer Protocol) and Gopher files 905. Secure Socket Layer (SSL) is an optional protocol used to encrypt communications between a Web browser and Web server.

Transport layer 910 provides transmission control functionality using protocols, such as TCP, UDP, SPX, and others, that add information for acknowledgments that blocks of the file had been received.

Network layer 920 provides routing functionality by adding network addressing information using protocols such as IP, IPX, and others, that enable data transfer over the network.

Data link layer 930 provides information about the type of media on which the data was originated, such as Ethernet, token ring, or fiber distributed data interface (FDDI), and others.

Physical layer 940 provides encoding to place the data on the physical transport, such as twisted pair wire, copper wire, fiber optic cable, coaxial cable, and others.

Description of this example environment in these terms is provided for convenience only. It is not intended that the invention be limited to application in this example environment. In fact, after reading the description herein, it will become apparent to persons skilled in the relevant art(s) how to implement the invention in alternative environments. Further details on designing, configuring, and operating storage area networks are provided in Tom Clark, "Designing Storage Area Networks: A Practical Reference for Implementing Fibre Channel SANs" (1999), which is incorporated herein by reference in its entirety.

SAN Appliance Embodiments

The present invention may be implemented in and operated from a SAN appliance that interfaces between the hosts and the storage subsystems comprising the SAN. The present invention is completely host (operating system) independent and storage system independent. As opposed to host-based remote mirroring solutions, data storage mirroring according to the present invention does not require special host software. As opposed to storage array based mirroring solutions, data storage mirroring according to the present invention is not tied to a specific storage vendor and operates with any type of storage, including fibre channel and SCSI.

As described above, the present invention may be implemented with a pair of SAN appliances, such as the SAN-Link™ appliance. For instance, local storage server 106 and mirror storage server 108 may each be SAN appliances. In embodiments, a web-based user interface may be used to centrally manage mirroring for the entire SAN.

Example Computer System

Figure 10:
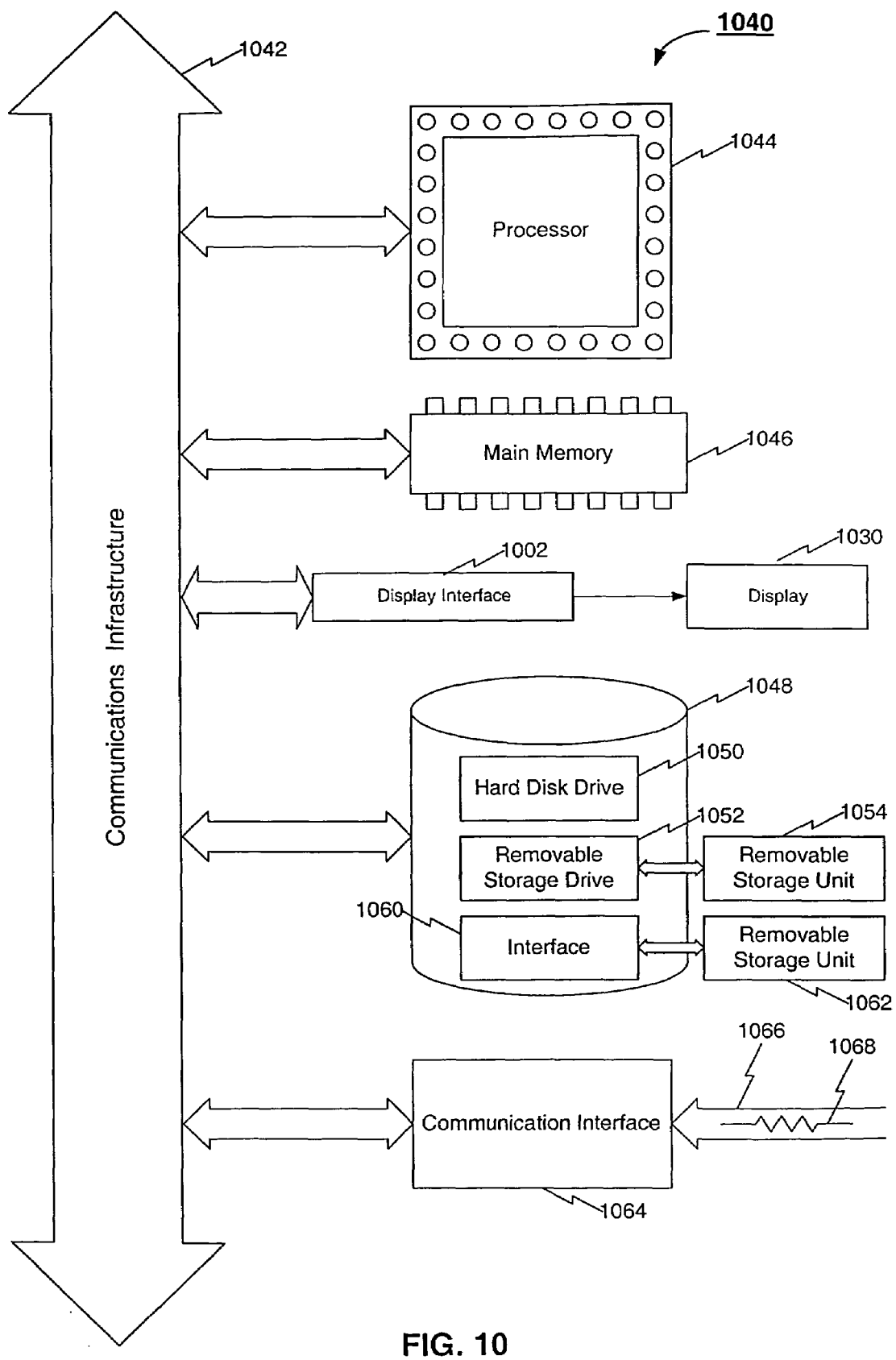
FIG. 10 shows an example of a computer system for implementing the present invention.

An example of a computer system 1040 is shown in FIG. 10. The computer system 1040 represents any single or multi-processor computer. In conjunction, single-threaded and multi-threaded applications can be used. Unified or distributed memory systems can be used. Computer system 1040, or portions thereof, may be used to implement the present invention. For example, each of the servers of the storage mirror of the present invention may comprise software running on a computer system such as computer system 1040.

In one example, the storage mirror of the present invention is implemented in a multi-platform (platform independent) programming language such as JAVA 1.1, programming language/structured query language (PL/SQL), hypertext mark-up language (HTML), practical extraction report language (PERL), common gateway interface/structured query language (CGI/SQL) or the like. Java™-enabled and JavaScript™-enabled browsers are used, such as, Netscape™, HotJava™, and Microsoft™ Explorer™ browsers. Active content Web pages can be used. Such active content Web pages can include Java™ applets or ActiveX™ controls, or any other active content technology developed now or in the future. The present invention, however, is not intended to be limited to Java™, JavaScript™, or their enabled browsers, and can be implemented in any programming language and browser, developed now or in the future, as would be apparent to a person skilled in the art given this description.

In another example, the storage mirror of the present invention, including worker thread generator module 202, connection thread generator module 204, and heartbeat thread generator module 206, may be implemented using a high-level programming language (e.g., C++) and applications written for the Microsoft Windows™ environment. It will be apparent to persons skilled in the relevant art(s) how to implement the invention in alternative embodiments from the teachings herein.

Computer system 1040 includes one or more processors, such as processor 1044. One or more processors 1044 can execute software implementing routines described above, such as shown in flowchart 1200. Each processor 1044 is connected to a communication infrastructure 1042 (e.g., a communications bus, cross-bar, or network). Various software embodiments are described in terms of this exemplary computer system. After reading this description, it will become apparent to a person skilled in the relevant art how to implement the invention using other computer systems and/or computer architectures. For example, n worker threads 208, n connection threads 210, heartbeat sender thread 212, heartbeat receiver thread 214, and re-synchronization threads 1102 may be executed on one or more of processor 1044.

Computer system 1040 can include a display interface 1002 that forwards graphics, text, and other data from the communication infrastructure 1042 (or from a frame buffer not shown) for display on the display unit 1030.

Computer system 1040 also includes a main memory 1046, preferably random access memory (RAM), and can also include a secondary memory 1048. The secondary memory 1048 can include, for example, a hard disk drive 1050 and/or a removable storage drive 1052, representing a floppy disk drive, a magnetic tape drive, an optical disk drive, etc. The removable storage drive 1052 reads from and/or writes to a removable storage unit 1054 in a well known manner. Removable storage unit 1054 represents a floppy disk, magnetic tape, optical disk, etc., which is read by and written to by removable storage drive 1052. As will be appreciated, the removable storage unit 1054 includes a computer usable storage medium having stored therein computer software and/or data.

In alternative embodiments, secondary memory 1048 may include other similar means for allowing computer programs or other instructions to be loaded into computer system 1040. Such means can include, for example, a removable storage unit 1062 and an interface 1060. Examples can include a program cartridge and cartridge interface (such as that found in video game devices), a removable memory chip (such as an EPROM, or PROM) and associated socket, and other removable storage units 1062 and interfaces 1060 which allow software and data to be transferred from the removable storage unit 1062 to computer system 1040.

Computer system 1040 can also include a communications interface 1064. Communications interface 1064 allows software and data to be transferred between computer system 1040 and external devices via communications path 1066. Examples of communications interface 1064 can include a modem, a network interface (such as Ethernet card), a communications port, interfaces described above, etc. Software and data transferred via communications interface 1064 are in the form of signals which can be electronic, electromagnetic, optical or other signals capable of being received by communications interface 1064, via communications path 1066. Note that communications interface 1064 provides a means by which computer system 1040 can interface to a network such as the Internet.

The present invention can be implemented using software running (that is, executing) in an environment similar to that described above with respect to FIG. 8. In this document, the term "computer program product" is used to generally refer to removable storage unit 1054, a hard disk installed in hard disk drive 1050, or a carrier wave carrying software over a communication path 1066 (wireless link or cable) to communication interface 1064. A computer useable medium can include magnetic media, optical media, or other recordable media, or media that transmits a carrier wave or other signal. These computer program products are means for providing software to computer system 1040.

Computer programs (also called computer control logic) are stored in main memory 1046 and/or secondary memory 1048. Computer programs can also be received via communications interface 1064. Such computer programs, when executed, enable the computer system 1040 to perform the features of the present invention as discussed herein. In particular, the computer programs, when executed, enable the processor 1044 to perform features of the present invention. Accordingly, such computer programs represent controllers of the computer system 1040.

The present invention can be implemented as control logic in software, firmware, hardware or any combination thereof. In an embodiment where the invention is implemented using software, the software may be stored in a computer program product and loaded into computer system 1040 using removable storage drive 1052, hard disk drive 1050, or interface 1060. Alternatively, the computer program product may be downloaded to computer system 1040 over communications path 1066. The control logic (software), when executed by the one or more processors 1044, causes the processor(s) 1044 to perform functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s) from the teachings herein.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of mirroring data in a computer network, comprising the steps of:
    establishing at least one connection between a local storage server and a mirror storage server;
    receiving a primary storage request from a network host at the local storage server;
    sending a mirror storage request across the established at least one connection from the local storage server to the mirror storage server, wherein the mirror storage request corresponds to the received primary storage request;
    processing the mirror storage request at the mirror storage server;
    sending a first heartbeat signal at regular first intervals from the local storage server to the mirror storage server;
    sending a second heartbeat signal at regular second intervals from the mirror storage server to the local storage server;
    monitoring reception of the first heartbeat signal and the second heartbeat signal for interruption in the regular receipt thereof respectively;
    detecting an interruption in the second heartbeat signal at the local storage server; and
    closing the established at least one connection.

2. The method of claim 1, further comprising the step of:
    queuing mirror storage requests that result from primary storage requests that are received during the detected interruption.

3. The method of claim 2, further comprising the steps of:
    receiving the second heartbeat signal at the local storage server after the detected interruption of the second heartbeat signal; and
    re-establishing the closed at least one connection between the local storage server and the mirror storage server.

4. The method of claim 3, wherein said mirror storage request sending step comprises the step of:
    sending the queued mirror storage requests across the re-established at least one connection after said re-establishing step.

5. The method of claim 4, wherein said detecting step comprises the step of:
    detecting an interruption in the second heartbeat signal at the local storage server that has a duration longer than a first predetermined amount of time.

6. The method of claim 3, wherein said re-establishing step comprises the steps of:
    monitoring the second heartbeat signal for a probationary interval of time; and
    re-establishing the closed at least one connection between the local storage server and the mirror storage server only if no interruptions in the second heartbeat signal are detected during said monitoring step.

7. The method of claim 1, wherein said processing step comprises:
    storing data of the received mirror storage request in a mirror storage device corresponding to a primary storage device.

8. The method of claim 7, further comprising the step of:
    sending a response across the established at least one connection from the mirror storage server to the local storage server, wherein the response indicates whether said storing data step was successful.

9. The method of claim 5, wherein said establishing step comprises the steps of:
    establishing n connections between the local storage server and the mirror storage server, wherein each of the n connections is between one of n worker threads in the local storage server and one of n connection threads in the mirror storage server, wherein n≧1;
    storing a local connection array of n elements on the local storage server, wherein each element of the local connection array corresponds to one of the n local worker thread that operates on the local storage server; and
    storing a mirror connection array of n elements on the mirror storage server, wherein each element of the mirror connection array corresponds to one of the n connection threads on the mirror storage server.

10. The method of claim 9, wherein said local connection array storing step comprises the step of:
    storing a local connection array of n elements, wherein each element comprises a socket and a timestamp; and
    wherein said mirror connection array storing step comprises the step of:
        storing a mirror connection array of n elements, wherein each element comprises a socket parameter and a timestamp parameter.

11. The method of claim 10, wherein said establishing step further comprises the step of:
    establishing each of the n connections according to the socket parameter stored in the corresponding one of the n elements of the stored local connection array.

12. The method of claim 11, further comprising the steps of:
    establishing a mirror heartbeat sender thread and a mirror heartbeat receiver thread in the mirror storage server; and
    establishing a local heartbeat sender thread and a local heartbeat receiver thread in the local storage server.

13. The method of claim 12, wherein the first heartbeat signal sending step and said second heartbeat signal sending step each further comprise the step of:
    sending a message at time intervals of a second predetermined amount of time.

14. The method of claim 13, wherein said first heartbeat signal sending step further comprises the step of:
    updating the timestamp parameter of each of the n elements of the mirror connection array whenever the message on the first heartbeat signal is received by the mirror heartbeat receiver thread; and
    wherein said second heartbeat signal sending step further comprises the step of:
        updating the timestamp parameter of each of the n elements of the local connection array whenever the message on the second heartbeat signal is received by the local heartbeat receiver thread.

15. The method of claim 14, wherein said detecting step further comprises the step of:

indicating in one of the n elements of the mirror connection array that the corresponding one of the established n connections is closed if the timestamp parameter of the one of the n elements is older than the first predetermined amount of time.

16. The method of claim 15, wherein said closing step comprises the steps of:

timing out one of the n connection threads on the mirror storage server if a request on the corresponding one of the established n connections has not arrived in a third predetermined amount of time; and closing and exiting the timed out connection thread if the corresponding one of the n elements in the mirror connection array is indicated to be closed.

17. The method of claim 16, further comprising the steps of:

receiving a first message on the first heartbeat signal after an interruption of the first heartbeat signal; and re-establishing the n connections between the local storage server and the corresponding connection threads on the mirror storage server.

18. The method of claim 17, wherein said second heartbeat signal receiving step comprises the step of:

receiving a first message on the second heartbeat signal after an interruption of the second heartbeat signal.

19. The method of claim 1, wherein the local storage server is operating in an asynchronous mirror mode, the method further comprising:

processing the primary storage request; and sending the results of the processed primary storage request to the network host.

20. The method of claim 1, wherein the local storage server is operating in a synchronous mirror mode, the method further comprising:

processing the primary storage request;

waiting for a response corresponding to the sent mirror storage request from the mirror storage server; and sending the results of the processed primary storage request to the network host after the response is received from the mirror storage server.

21. The method of claim 1, the method further comprising:

determining whether a LUN related to the received primary storage request is designated to be mirrored.

22. The method of claim 1, wherein the established at least one connection is a TCP connection.

23. The method of claim 13, wherein said sending a message steps each comprise the step of:

sending a user datagram protocol message at time intervals of the second predetermined amount of time.

24. The method of claim 1, wherein at least one of the step of sending a first heartbeat signal and the step of sending a second heartbeat signal includes:

periodically sending a User Datagram Protocol (UDP) message.

25. A method of bi-directional mirroring of data in computer networks, comprising the steps of:

establishing a first connection between a local storage server and a remote storage server;

establishing a second connection between the local storage server and the remote storage server;

receiving a first local storage request from a first network host at the local storage server;

sending a first local mirror storage request from the local storage server across the first connection, wherein the first local mirror storage request corresponds to the first received local storage request;

receiving the first local mirror storage request at the remote storage server;

storing data received in the first local mirror storage request in at least one remote storage device coupled to the remote storage server;

receiving a first remote storage request from a second network host at the remote storage server;

sending a first remote mirror storage request from the remote storage server across the second connection, wherein the first remote mirror storage request corresponds to the received first remote storage request;

receiving the first remote mirror storage request at the local storage server;

storing data received in the first remote mirror storage request in at least one local storage device coupled to the local storage server;

sending a first heartbeat signal from the local storage server to the mirror storage server;

sending a second heartbeat signal from the remote storage server to the local storage server;

monitoring reception of the first heartbeat signal and the second heartbeat signal for interruption in the regular receipt thereof, respectively;

detecting an interruption in the second heartbeat signal at the local storage server; and closing the first connection.

26. The method of claim 24, further comprising the steps of:

receiving at least a second local storage request at the local storage server; and queuing at least a second local mirror storage request at the local storage server, wherein the at least a second local mirror storage request corresponds to the received at least a second local storage request.

27. The method of claim 26 further comprising the steps of:

receiving the second heartbeat signal at the local storage server after the detected interruption of the second heartbeat signal; and re-establishing the closed first connection between the local storage server and the mirror storage server.

28. The method of claim 27, further comprising the step of:

sending the queued at least a second local mirror storage request across the re-established first connection after said re-establishing step.

29. The method of claim 24, further comprising:

receiving at least a second remote storage request at the remote storage server; and queuing the at least a second remote mirror storage request at the remote storage server, wherein the at least a second remote mirror storage request corresponds to the received at least a second remote storage request.

30. The method of claim 29, further comprising the steps of:

receiving the first heartbeat signal at the remote storage server after the detected interruption of the first heartbeat signal; and re-establishing the closed second connection between the local storage server and the mirror storage server.

31. The method of claim 30, further comprising the step of:

sending the queued at least a second remote mirror storage request across the re-established second connection after said re-establishing step.

32. The method of claim 25, wherein at least one of the step of sending a first heartbeat signal and the step of sending a second heartbeat signal includes:
periodically sending a User Datagram Protocol (UDP) message.

33. A system for mirroring data in a computer network, comprising:
a local storage server; and
a mirror storage server;
wherein the local storage server receives a storage request, outputs a mirror storage request, and outputs a first heartbeat signal at regular first intervals to the mirror storage server; and
wherein the mirror storage server receives and processes said mirror storage request, outputs a response corresponding to said mirror storage request to said local storage server, outputs a second heartbeat signal at regular second intervals to said local storage server, and monitors reception of said first heartbeat signal for interruption in the regular receipt thereof;
wherein at least one of said local storage server and said mirror storage server establishes at least one connection therebetween;
wherein said local storage server monitors reception of said second heartbeat signal and detects an interruption in the regular receipt thereof; and
wherein at least one of said local storage server and said mirror storage server closes the established at least one connection.

34. The system of claim 33, wherein said local storage server comprises:
a local work thread generator module that generates n local worker threads; and
a local connection array that includes n elements; and
wherein said a mirror storage server comprises:
a mirror connection array that comprises n elements; and
a mirror connection thread generator module that generates n mirror connection threads.

35. The system of claim 34, wherein each of said n mirror connection threads are connected to a corresponding one of said n local worker threads using a corresponding socket parameter stored in each of said n elements of said mirror connection array to form n corresponding connections.

36. The system of claim 35, wherein said local storage server comprises:
a local heartbeat thread generator module that generates a local heartbeat sender thread and a local heartbeat receiver thread; and
wherein said mirror storage server comprises:
a mirror heartbeat thread generator module that generates a mirror heartbeat sender thread and a mirror heartbeat receiver thread;
wherein said local heartbeat sender thread sends said first heartbeat signal to said mirror heartbeat receiver thread, and said mirror heartbeat sender thread sends said second heartbeat signal to said local heartbeat receiver thread.

37. The system of claim 36, wherein each of n elements of said local connection array comprises a timestamp parameter, wherein said local heartbeat receiver thread updates each said timestamp parameter in said local connection array when a message is received on said second heartbeat signal.

38. The system of claim 37, wherein said local heartbeat sender thread indicates in at least one of the n elements of the mirror connection array that the corresponding at least one of the established n connections is closed if the corresponding timestamp parameter is older than the first predetermined amount of time.

39. The system of claim 37, wherein one of said n mirror connection threads times out if a corresponding mirror storage request is not received from said local storage server for a second predetermined amount of time, wherein after said time out said one of said n mirror connection threads checks the timestamp of the corresponding one of the n elements and exits if said corresponding timestamp is older than a second predetermined amount of time.

40. The system of claim 33, wherein at least one of the local storage server and the mirror storage server is operable to send the first and second heartbeat signals, respectively, by
periodically sending a User Datagram Protocol (UDP) message.

41. A computer program product comprising a computer useable medium storing a computer program thereon for enabling at least one processor to mirror data in a computer network, said computer program product comprising:
means for enabling the processor to establish at least one connection between a local storage server and a mirror storage server;
means for enabling the processor to receive a primary storage request from a network host at the local storage server;
means for enabling the processor to send a mirror storage request across the established at least one connection from the local storage server to the mirror storage server, wherein the mirror storage request corresponds to the received primary storage request;
means for enabling the processor to send a first heartbeat signal at regular first intervals from the local storage server to the mirror storage server;
means for enabling the processor to send a second heartbeat signal at regular second intervals from the mirror storage server to the local storage server;
means for monitoring reception of the first heartbeat signal and the second heartbeat signal for interruption in the regular receipt thereof, respectively;
means for enabling the processor to detect an interruption in the second heartbeat signal at the local storage server; and
means for enabling the processor to close the established at least one connection.

42. The computer program product of claim 41, further comprising:
means for enabling the processor to queue mirror storage requests that result from primary storage requests that are received during the detected interruption.

43. The computer program product of claim 42, further comprising:
means for enabling the processor to receive the second heartbeat signal at the local storage server after the detected interruption of the second heartbeat signal; and
means for enabling the processor to re-establish the closed at least one connection between the local storage server and the mirror storage server.

44. The computer program product of claim 43, further comprising:
means for enabling the processor to send the queued mirror storage requests across the re-established at least one connection.

45. The method of claim 41, further comprising:
means for enabling the processor to receive a response across the established at least one connection from the mirror storage server, wherein the response indicates whether data in said sent mirror storage request was successfully stored in a mirror storage device.

46. The computer program product of claim 41, wherein at least one of the means for enabling the processor to send a first heartbeat signal and the means for enabling the processor to send a second heartbeat signal includes:
means for periodically sending a User Datagram Protocol (UDP) message.

47. A method of mirroring data in a computer network, comprising the steps of:
establishing at least one connection between a local storage server and a mirror storage server;
receiving a primary storage request from a network host at the local storage server;
sending a mirror storage request across the established at least one connection from the local storage server to the mirror storage server, wherein the mirror storage request corresponds to the received primary storage request;
processing the mirror storage request at the mirror storage server;
sending a first heartbeat signal at regular first intervals from the local storage server to the mirror storage server;
sending a second heartbeat signal, independent of the first heartbeat signal, at regular second intervals from the mirror storage server to the local storage server; and
monitoring reception of at least one the first heartbeat signal and the second heartbeat signal for interruption in the regular receipt thereof respectively;
detecting an interruption in the second heartbeat signal at the local storage server; and
closing the established at least one connection.

48. A method of mirroring data in a computer network, comprising the steps of:
establishing at least one connection between a local storage server and a mirror storage server;
receiving a primary storage request from a network host at the local storage server;
sending a mirror storage request across the established at least one connection from the local storage server to the mirror storage server, wherein the mirror storage request corresponds to the received primary storage request;
processing the mirror storage request at the mirror storage server;
sending a first heartbeat signal using a connectionless protocol at regular first intervals from the local storage server to the mirror storage server;
sending a second heartbeat signal using a connectionless protocol at regular second intervals from the mirror storage server to the local storage server; and monitoring reception of at least one the first heartbeat signal and the second heartbeat signal for interruption in the regular receipt thereof, respectively;
detecting an interruption in the second heartbeat signal at the local storage server; and
closing the established at least one connection.

* * * * *

UNITED STATES PATENT AND TRADEMARK OFFICE
CERTIFICATE OF CORRECTION

PATENT NO. : 7,386,610 B1
APPLICATION NO. : 09/664499
DATED : June 10, 2008
INVENTOR(S) : Nicos A. Vekiarides It is certified that error appears in the above-identified patent and that said Letters Patent is hereby corrected as shown below:

On page 2, in field (56), under "U.S. Patent Documents", in column 2, line 65, delete "6,016,676" and insert -- 6,014,676 --, therefor.

On page 3, in field (56), under "Other Publications", in column 1, lines 17-18, delete "http://ww.emc.com/product_pdfs/pdg/symm_3_5_pdg.pdf, pp. 7-32." and insert -- http://www.emc.com/products/product_pdfs/pdg/symm_3_5_pdg.pdf, pp. 1-32. --, therefor.

On page 3, in field (56), under "Other Publications", in column 1, line 23, delete "Gate" and insert -- Gale --, therefor.

On page 3, in field (56), under "Other Publications", in column 2, line 1, delete "date:" and insert -- data: --, therefor.

On page 3, in field (56), under "Other Publications", in column 2, line 2, after "Recovery" insert -- Features --.

On page 3, in field (56), under "Other Publications", in column 2, line 18, delete "SAH" and insert -- SAN --, therefor.

On page 3, in field (56), under "Other Publications", in column 2, line 20, delete "Reports" and insert -- Report: --, therefor.

On page 3, in field (56), under "Other Publications", in column 2, line 56, delete "Nowe" and insert -- News --, therefor.

In column 8, line 15, after "Arbitrated" insert -- Loop --.

In column 8, line 16, after "up to" delete "Loop".

In column 8, line 31, after "Logical" insert -- Unit --.

In column 8, line 32, after "For" delete "Unit".

In column 8, line 42, after "Point-to-" insert -- point --.

In column 8, line 43, after "devices." delete "point".

UNITED STATES PATENT AND TRADEMARK OFFICE
CERTIFICATE OF CORRECTION

PATENT NO.        : 7,386,610 B1
APPLICATION NO.   : 09/664499
DATED             : June 10, 2008
INVENTOR(S)       : Nicos A. Vekiarides It is certified that error appears in the above-identified patent and that said Letters Patent is hereby corrected as shown below:

In column 8, line 44, after "Private" insert -- loop --.

In column 8, line 45, after "attachment." delete "loop".

In column 27, line 39, in Claim 1, delete "thereof" and insert -- thereof, --, therefor.

In column 30, line 29, in Claim 26, delete "claim 24," and insert -- claim 25, --, therefor.

In column 30, line 37, in Claim 27, delete "claim 26" and insert -- claim 26, --, therefor.

In column 30, line 49, in Claim 29, delete "claim 24," and insert -- claim 25, --, therefor.

In column 32, line 36, in Claim 41, after "server;" insert -- and --.

In column 33, line 32, in Claim 47, after "one" insert -- of --.

In column 34, line 2, in Claim 47, after "thereof" insert -- , --.

In column 34, line 25, in Claim 48, after "one" insert -- of --.

Signed and Sealed this

First Day of September, 2009

David J. Kappos
*Director of the United States Patent and Trademark Office*